US005784683A

United States Patent [19]

Sistanizadeh et al.

[11] Patent Number: 5,784,683
[45] Date of Patent: Jul. 21, 1998

[54] SHARED USE VIDEO PROCESSING SYSTEMS FOR DISTRIBUTING PROGRAM SIGNALS FROM MULTIPLEXED DIGITIZED INFORMATION SIGNALS

[75] Inventors: Kamran Sistanizadeh, Arlington; John W. Seazholtz, Great Falls, both of Va.; William F. Lawrence, Gaithersburg, Md.

[73] Assignee: Bell Atlantic Network Services, Inc., Arlington, Va.

[21] Appl. No.: 546,255

[22] Filed: Oct. 20, 1995

Related U.S. Application Data

[63] Continuation-in-part of Ser. No. 441,977, May 16, 1995.
[51] Int. Cl.[6] ................................................ H04N 1/00
[52] U.S. Cl. .............................. 455/5.1; 455/4.2; 370/487
[58] Field of Search ............................ 455/4.2, 5.1, 6.1; 348/12, 6, 13, 7, 10; 370/487

[56] References Cited

U.S. PATENT DOCUMENTS

| | | |
|---|---|---|
| 2,629,816 | 2/1953 | Rabuteau. |
| 3,836,726 | 9/1974 | Wells et al.. |
| 4,255,814 | 3/1981 | Osborn. |
| 4,302,771 | 11/1981 | Gargini. |
| 4,367,548 | 1/1983 | Cotten, Jr. et al.. |
| 4,616,256 | 10/1986 | Boutmy. |
| 4,718,109 | 1/1988 | Breeden et al.. |
| 4,760,442 | 7/1988 | O'Connell et al.. |
| 5,038,403 | 8/1991 | Leitch. |
| 5,117,503 | 5/1992 | Olson. |
| 5,127,101 | 6/1992 | Rose, Jr.. |
| 5,128,925 | 7/1992 | Dornstetter et al.. |
| 5,136,411 | 8/1992 | Paik et al.. |
| 5,181,106 | 1/1993 | Sutherland. |
| 5,230,086 | 7/1993 | Saul. |
| 5,231,494 | 7/1993 | Wachob. |
| 5,239,671 | 8/1993 | Linquist et al.. |
| 5,239,672 | 8/1993 | Kurby et al.. |
| 5,243,598 | 9/1993 | Lee. |
| 5,247,347 | 9/1993 | Litteral et al.. |
| 5,268,933 | 12/1993 | Averbuch. |

(List continued on next page.)

OTHER PUBLICATIONS

Caffrey, J.. "MMDS (Wireless Cable): An Alternative Delivery Medium for Digital Terrestrial Television," International Broadcasting Convention, 16–20 Sep. 1994, Conference Publication No. 397, ©IEE, 1994.

Lambert, Peter, "FM Wireless TV to Bite the Apple," Broadcasting, Dec. 21, 1992, pp. 46–47.

Primary Examiner—Victor R. Kostak
Attorney, Agent, or Firm—McDermott, Will & Emery

[57] ABSTRACT

A broadcast system supplies multiplexed channels to a plurality of receiving systems. The broadcast system preferably comprises a wireless digital simulcasting network. Each multiplexed channel carries multiplexed digital information signals relating to a group of programs. At least one of the receiving systems serves a plurality of living units. The multi-unit receiving system includes common equipment to perform as much of the processing of the digital information signals as is practical for the particular installation. The common equipment includes a digital receiver processing each multiplexed channel to capture a digital transport stream therefrom and a demultiplexer for separating out the digital information signals for each program from each digital transport stream. A switch routes selected information signals to individual drops or loops going to the living units. In one implementation, each digital information signal is modulated, and selected modulated signals are routed and transported over telephone wiring to terminals in the living units. The terminals demodulate and decode selected program signals for presentation on a television. In a second implementation, a decoder in the common equipment decodes each digital information signal, and the common equipment transmits an analog television channel carrying decoded signals for selected programs over coaxial cables to the living units. In this implementation, the added equipment required in a living unit includes only a remote control, an infrared receiver and a data device to transmit program request messages over coaxial cable to the common equipment.

35 Claims, 13 Drawing Sheets

U.S. PATENT DOCUMENTS

| | | |
|---|---|---|
| 5,274,666 | 12/1993 | Dowdell et al. . |
| 5,291,289 | 3/1994 | Hulyalkar et al. . |
| 5,303,229 | 4/1994 | Withers et al. . |
| 5,355,529 | 10/1994 | Linquist et al. . |
| 5,363,432 | 11/1994 | Martin et al. . |
| 5,387,927 | 2/1995 | Look et al. . |
| 5,404,575 | 4/1995 | Lehto . |
| 5,410,343 | 4/1995 | Coddington et al. . |
| 5,412,426 | 5/1995 | Totty . |
| 5,425,027 | 6/1995 | Baran . |
| 5,550,578 | 8/1996 | Hoarty et al. ............... 455/5.1 |
| 5,581,479 | 12/1996 | McLaughlin et al. ............... 455/4.2 |
| 5,630,204 | 5/1997 | Hylton et al. ............... 455/5.1 |
| 5,640,194 | 6/1997 | Suzuki et al. ............... 455/4.2 |

SHARED USE VIDEO PROCESSING SYSTEMS FOR DISTRIBUTING PROGRAM SIGNALS FROM MULTIPLEXED DIGITIZED INFORMATION SIGNALS

CROSS-REFERENCE TO RELATED APPLICATION

This application is a continuation in part of U.S. patent application Ser. No. 08/441,977 filed May 16, 1995 entitled "SHARED RECEIVING SYSTEMS UTILIZING TELEPHONE CABLES AS VIDEO DROPS", the disclosure of which is incorporated herein in its entirety by reference.

TECHNICAL FIELD

The present invention relates to distribution of program information, e.g. video, audio and data, particularly to shared receiving systems serving multiple living units. More specifically, the present invention relates to shared receiving systems processing broadcast digitally multiplexed program signals (preferably from a wireless simulcast system) to derive a signal for each program and supplying the signal for a selected program over on-premises wiring to each individual living unit.

BACKGROUND ART

In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution. Because of the wide bandwidth available on cable television systems, additional channels were available for the new programming. To increase revenues, cable television systems initiated distribution of premium channels viewable only by subscribers having appropriate descramblers. The subscriber tunes the descrambler to receive a premium channel, descramble the video and audio information and supply a signal capable of reception on a standard television set.

Recently, several different wideband digital distribution networks have been proposed for offering subscribers an array of video services, including true Video On Demand service. The following U.S. Patents disclose representative examples of such digital video distributions networks: U.S. Pat. Nos. 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. In particular, Litteral et al. U.S. Pat. No. 5,247,347 discloses a digital video distribution network providing subscribers with access to multiple Video On Demand service providers through the public switched telephone network, as described in more detail below.

Although the digital landline systems provide some enhanced services, such as video on demand, implementation and deployment to provide service to actual customers has remained limited because of a number of technical and economic problems. To develop and deploy fiber optical systems for providing wide bandwidth to carry a large number of services into every living unit is expensive. Also, community regulations in many areas now require placement of new cabling underground. Some property owners will not agree to allow utility companies to dig up their property to lay the new cables, and even where the owner permits such an installation, the underground installation of fiber and/or coaxial drop cables from fiber backbone circuits only further increases the expense and difficulty of deployment.

The use of public switched telephone network wiring suggested by Litteral et al. reduces the need to install new fiber or cable, but the system disclosed therein is severely limited in terms of its service capability. As disclosed, direct cross connect switching provides point-to-point connectivity to the subscriber lines for interactive services, particularly video on demand. There is some limited point-to-multipoint capability, but not enough to cost effectively provide an array of broadcast type services competitive with current offerings through franchise based analog cable television systems.

Thus, a need still exists to provide a cost effective way to supply new digital broadband services to living units where it is not cost effective to deploy new fiber and cable to service those units.

Wireless video distribution is subject to much lower installation costs. However, as discussed below, wireless systems intended to compete with franchise cable services also have been subject to a number of problems and limitations. "Wireless cable" is a term usually used to refer to a multi-channel video distribution medium that resembles franchise cable television, but which uses microwave channels rather than coaxial cable or wire to transmit programming to subscribers. Programming for wireless cable systems is received at the headend of the wireless cable system in the same manner as it is for landline based cable television. These programs are then re-transmitted, utilizing the high end of the Ultra High Frequency (UHF) portion of the microwave radio frequency spectrum (2.1 to 2.7 Ghz), by a microwave transmitting antenna located on a tower or other tall structure to small antennas on subscriber rooftops, typically within a 40 mile radius.

In a typical prior art system, such as shown in FIG. 1, a headend system H receives up to a maximum of 33 analog television program signals from a variety of satellite downlink receivers and other types of receivers, in the exact same manner as for a cable television system. The headend system H frequency multiplexes those television program signals into a combined spectrum signal in the 50-450 Mhz range. This combined signal has a frequency distribution similar to that found on a cable television network. The headend system upconverts the combined spectrum signal to the UHF frequency range, typically centered around 2.6 Ghz. The headend system supplies the UHF signal to a single transmitter antenna tower T which broadcasts the signal to subscribers who each have an individual home receiving system. Subscribers can call in to the headend to order pay-per-view events via the telephone network, and the headend transmits codes to the subscribers systems to enable descrambling of encoded pay-per-view programs.

FIG. 1A shows a typical service area for a wireless cable type system of the type shown in FIG. 1. In accord with relevant regulations, a multi-channel multi-point distribution service (MMDS) type wireless cable operator has a protected or 'primary' reception area P. At the relevant frequencies here under consideration, the primary area P is a circle having a radius of 15 miles from the operator's transmitter T. Within this area, the operator is guaranteed that there will be no interference with his transmissions on the assigned frequency channel(s). However, at the allowable power levels, the transmissions from antenna tower T will propagate out over a secondary area S having a radius of up to 40 miles. Within the secondary area, some locations will receive sufficient signal strength to utilize the wireless cable services.

UHF signals in the relevant frequency band arrive at a receiver location by direct line-of-sight (LOS) transmission. Typically an elliptical dish shaped antenna 18–36 inches long, formed of parallel curved elements, is aimed from the subscriber location to receive the strongest signal from the transmitter. The captured signals are down-converted at the antenna from the microwave band to the broadcast band and transmitted via coaxial wiring into the house. For scrambled signals (the typical case), a set top converter functionally similar to a cable set top box is used. In many UHF installations, to conserve UHF capacity for premium services, a VHF/UHF off-air broadcast receive antenna is installed with the UHF antenna to pick up the local programming.

To a user or subscriber, wireless cable operates as a cable look-alike service. Because wireless cable signals are transmitted over the air rather than through underground or above-ground cable networks, wireless systems are less susceptible to outages and are less expensive to operate and maintain than franchise cable systems. Most service problems experienced by wireless cable subscribers are home-specific rather than neighborhood-wide, as is frequently the case with franchise cable systems.

The evolution of wireless cable, leading to certain problems, may be briefly summarized as follows. Wireless cable technology has existed in a single channel version for commercial purposes since the 1970's and had been available even longer for educational use. In mid-1983, the FCC, invoking the need to promote competition with conventional cable television systems, established a change in the rules for using a portion of the microwave spectrum previously designated for educational use. In the past, 28 microwave channels had been available to accredited and non-profit educational organizations for educational use exclusively by Instructional Television Fixed Service (ITFS) operators. Rules reallocated eight of those channels for outright commercial use, and educational organizations were permitted to lease excess hours to commercial operators on the remaining 20 channels. In any local market, this makes it possible for a commercial operator to combine any or all of those 28 channels with five other channels already available for commercial use. Under current FCC rules, the available spectrum results in a maximum of 33 analog channels. This number of 'wireless cable' channels is less than the number offered on many competing franchise type cable television systems.

Since 1983 spectrum blocks in the 2.1–2.7 Ghz range have been allocated for the purpose of delivering video content from a single transmit site to multiple receive locations. A total of 198 Mhz has been allocated for downstream transmission for the wireless cable service. The channelization and transmission modulation (6 Mhz amplitude modulation/vestigial side band) are equivalent to broadcast TV or cable but up-converted to microwave frequencies.

The 33 channels potentially available to wireless cable operators therefore are subdivided into two types of channels. Twenty channels are referred to as ITFS. The remaining 13 channels are generally referred to as Multi-channel Multipoint Distribution Service (MMDS).

The current UHF spectrum was originally licensed in blocks of four video channels each separately licensed, with each block allocated to a specific purpose. Five groups, each with four channels, were allocated to Instructional Television Fixed Service (ITFS). ITFS spectrum was initially made available only to educational institutions. Two groups of four channels were made available to anyone wishing to provide an alternative multi-channel video program service. The final four channels were licensed individually to institutions for the purpose of providing a private video network. Over time, the FCC relaxed some of these operational rules. Through licensing and leasing arrangements, the FCC now allows all of the channels to be aggregated for the purpose of providing an alternative to franchise cable television. However, even in areas where it is possible for one operator to aggregate the necessary licenses, the system capacity is still limited, i.e. to 33 channels or less.

In many ways, current typical UHF wireless TV is equivalent to at most a low tier franchise cable television system (i.e. having relatively few channels). Other than the number of program channels, the only real difference arises in the medium used to transport signals from the headend to the customer. Functionally identical headend equipment is utilized in both systems. In the case of UHF service, signals leave the headend via a microwave transmitter. With cable television, the same signals leave the headend on fiber or coaxial cable facilities. However, wireless cable systems have had difficulty competing because today many cable systems offer a more diverse range of programs.

Technical problems with microwave frequency broadcast also have limited the commercial practicality of the wireless cable services. As noted above, propagation characteristics at the relevant UHF operating frequencies require line-of-sight (LOS) between the transmit and receive antennas for reliable service reception. Both natural obstructions such as hills and vegetation, and man-made obstructions such as buildings, water towers and the like, limit the actual households capable of receiving an LOS transmission. FIG. 1A also shows a simplified example of one such obstruction O. As illustrated, the obstruction O is within the primary reception area P. The obstruction blocks line-of-sight transmissions from transmitter antenna tower T in a radially extending blockage or shadow area B. Receiving systems within this area can not receive the transmissions from antenna T, and potential customers in that area B can not subscribe to the wireless cable services broadcast from that tower.

One solution to the blockage problem has been to provide repeaters. A repeater receives the primary transmission from tower T on the tower side of the obstruction, amplifies the signal if necessary, and retransmits the signal into the area of blockage. This may be an effective solution to one blockage or obstruction O, but in many major metropolitan areas there are many obstructions. The power levels of such repeaters tend to be low. Overcoming blockages due to many different obstructions to the primary transmissions as well as distortions that result when amplifying combined RF channels would require an inordinate number of repeaters. Also, because of delays and multipath effects, repeater transmissions may interfere with reception from the primary source in areas close to the blockage area B.

In the industry, a nominal figure for households reachable by LOS is 70%, even with a small, commercially practical number of repeaters. This projected number is based solely on computer models, not actual field measurements. It is believed that actual coverage by the current wireless cable technology in the UHF medium is considerably lower. Typical antenna heights required to achieve the present level of coverage in commercial service are 800-plus feet for transmitters and 30–60 feet for receivers. That means that many receive antennas must be mounted atop masts or nearby trees as an alternative to a rooftop mounting. While current regulations provide a 15 mile protected service area for MMDS, it is desired that effective system coverage for approximately 40–70% of the affected households may be achieved to a 40 mile radius from the transmitter antenna.

Besides signal blockage, several other propagation factors can affect reliable UHF service delivery. One factor is multi-path reflections of the desired signal arriving at the receiver by way of differing paths and therefore arriving with slight delay. For analog video signals, multi-path appears as ghost images on the viewer's TV. For digital signals, multi-path can cause intersymbol interference that results in multiple bit errors. In either case, near-coincident multi-path signals can cause a degree of signal cancellation that looks like additional propagation loss. Multi-path also results from reflections and diffraction.

Path fading is another significant coverage factor. Time-variant path fading can result from atmospheric effects, e.g., rain or temperature and pressure inversions. Rain can act to partially reflect or absorb the microwave signals. Weather inversions can result in an upward bending of the wave front due to refraction. There are engineering measures to mitigate the troublesome effects of time-variant path fading, such as suitable fade margins and antenna diversity.

In the paging and radio communication fields, various systems of sequencing and simulcasting have been proposed to achieve some increased coverage. Examples of typical proposed systems are illustrated in FIG. 2 and 3. The related systems are described in U.S. Pat. Nos. 3,836,726, issued September 1974 and 5,038,403 issued Aug. 6, 1991. FIG. 2 illustrates a system utilizing sequencing while FIG. 3 illustrates a system utilizing simulcasting. As can be seen, the aim is to cover maximum area with minimum area of signal overlap. Even if someone suggested application to UHF Wireless Cable type communications, such propagation fields would still exhibit the above noted problems due to obstructions, multi-path interference and fading.

Clearly a need exists for a wireless broadcast system providing increased propagation coverage and reduced areas of blockages. Any such system should also provide an increased number of programs, without requiring additional spectrum allocation. The system should provide good signal quality throughout the entire reception area or service area. Accordingly, it is also desirable to minimize multipath interference and loss of service due to fading.

An additional set of problems arise in providing video service, such as the wireless cable service, to certain types of multiple living unit residences. For example, rewiring of existing apartment complexes for fiber and/or cable often is not feasible, either because of prohibitive costs or because of difficulties in actually running the fiber or cable through existing buildings without substantially dismantling the buildings in the process.

Reissue U.S. Pat. No. 34,611 to Fenwick et al. discloses a video distribution system for a multiple unit facility, such as a hotel or hospital. A central unit or hub transmits selected video programs over dedicated channels to a number of independently controlled video monitors. On a coaxial cable serving one group of the monitors, one frequency channel is dedicated to each monitor. The Fenwick et al. system provides only dedicated services, not broadcast services. Also, the Fenwick et al. system is an entirely analog system.

U.S. Pat. No. 5,010,399 to Goodman et al. suggests a solution to the rewiring problem. This Patent discloses a system for transmitting signals between components of a video system over the telephone wiring of a residence. The Goodman et al. system, however, only provides transport from a single VCR to a plurality of televisions within one customer premises. Also, the Goodman et al. system provides analog NTSC signal transport over the telephone wiring. Such transport is not feasible in a multi-unit dwelling because of cross-talk and other interference problems encountered in multi-pair cable runs.

Also, many planned development communities have restrictive covenants which run with ownership of the property. In such communities, whether the homes are town houses or single family homes, the covenants may prevent installation of visible outside receiving antennae. Also, only a few homes in the community may have a good location for a line of sight receiving antenna. In apartment complexes, the residents may not be able to locate a dish type antenna outside at all, or if allowed to have such an outside antenna, they may not have access to a point on the building from which to aim the antenna at the transmitter tower.

Another set of problems arise in installation of upgraded communications networks in multi-unit dwellings. The new networks require some type of sophisticated terminal device in each living unit, and often require one such terminal for each television in each living unit. These terminals often are prohibitively expensive. Even if initial installation is commercially feasible, maintenance of the terminals in a rental complex is not. At the best of times, most tenants do not adequately care for fixtures on the rental property and at times are deliberately destructive. Placement of expensive new terminals in rental units subjects those terminals to similar risks of damage. Also, some tenants may steal the expensive terminals, particularly when the tenants leave or are evicted.

Clearly an additional need exists for cost effective systems for supplying wireless cable broadcast signals to multiple living unit installations.

DISCLOSURE OF THE INVENTION

The present invention provides methods and apparatus to address the above stated needs.

The present invention relates to a shared communication system serving a number of living units. Common or 'hub' equipment in the system receives multiplexed digitized information signals relating to a plurality of programs, preferably from a broadcast network. The common equipment includes means for processing the digitized information signals to derive separate program signals, each of which contains information relating to a single one of the programs. Lines couple the common equipment to broadband output devices, e.g. television sets, in the living units. The common equipment includes a switch coupled between the means for processing and the lines, for routing selected program signals over the lines to individual living units. The system also includes a hub controller. The hub controller controls the routing functionality of the switch in response to program requests received via the lines.

In the preferred embodiments, the multiplexed digitized information signals comprise digital transport streams carried on multiplexed channels. Each digital transport stream contains multiplexed digital information relating to a group of the programs. The digital multiplexing of groups of programs into each channel increases the number of programs broadcast through a limited number of channels. The programs may be audio only or data, but in the currently preferred embodiment, a number of the broadcast programs comprise audio/visual information such as television programming. In such a television system, each program is digitally encoded into compressed digital data. A multiplexer combines the compressed digital data for a group of programs into one of the digital multiplexed data streams for transport through one of the channels. The means for processing the digitized information signals includes a digital receiver and an associated demultiplexer, for processing signals from each of the multiplexed channels. Each digital receiver processes a different one of the multiplexed channels to recover the digital transport stream therefrom, and an associated demultiplexer demultiplexes each recovered digital transport stream, to thereby derive separate digital program signals.

The placement of the more expensive processing elements in the common or 'hub' equipment spreads the cost of such elements over all living units served by the shared system. Also, such elements typically are placed in a restricted location making them less susceptible to damage or theft. As much as possible, the terminal equipment in the subscriber premises is minimized, to minimize the cost of installing terminals in large numbers of living units and to reduce maintenance, damage and theft problems.

Two different embodiments are disclosed for transporting selected program signals to the individual living units, based on the type of wiring available in the multi-unit building or complex.

In a first embodiment, the lines to the living units comprise telephone loops, e.g. twisted wire pairs. In existing buildings, such telephone wiring is already in place and runs from an equipment room (e.g. in the basement) to the living units. New wiring often is unnecessary. In this embodiment, a modulator modulates each digital program signal into a frequency range and modulation format compatible with telephone line transport. In response to a selection request, the controller instructs the switch to route the modulated signal for the selected program through for coupling to the requesting subscriber's telephone line. A terminal in the living unit includes a demodulator and a digital decoder to convert the selected program signal to a format for presentation on a television set.

In a second implementation utilizing coaxial cables, the common equipment includes digital decoders. One decoder processes each separate digital program signal. The decoders output baseband television signals. A modulator is coupled between an output port of the switch and each subscriber's coaxial drop cable. In response to a selection request, the controller instructs the switch to route the baseband signal for the selected program through to the modulator coupled to the requesting subscriber's coaxial drop cable. The modulator modulates the baseband signal into a television channel and transmits that channel signal over the drop cable to the subscriber's living unit. A standard television set directly receives the transmitted television channel signal and provides a television type audio/video presentation to the viewer. In this implementation, the equipment required in a living unit includes only the television, a remote control, an infrared transceiver and a data device to transmit program request messages over coaxial cable to the common equipment.

The preferred embodiment utilizes a wireless digital simulcasting network to broadcast the broadband information to various customer premises receiving systems, including one or more of the shared receiving systems discussed above. A signal including the multiplexed channels is transmitted simultaneously from a plurality of spaced transmitting sites. The transmitting sites propagate the signal into substantially overlapping regions of at least a major portion or the intended reception area. The overlapping transmission or propagation areas reduce or eliminate blockage zones and effects of fading. This technique also limits the number of receivers effected by equipment outages. Typically, a directional receiving antenna can be aimed toward at least one strong line-of-sight transmission source.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTIONS OF DRAWINGS

BEST MODE FOR CARRYING OUT THE INVENTION

The present invention contemplates use of a common or shared receiving system providing broadband services, typically from a broadcast network, over customer premises wiring to a plurality of individual living units in a multi-living unit complex. The broadcast network utilizes digital transport, and the common equipment performs as much of the processing of the digital signals as is possible for the particular installation. The terminal devices in the living units are relatively simple.

The detailed description below covers an entire end to end communication system. For ease of explanation, the following discussion will progress from source, through broadcast transmission, through shared processing to processing and display in the living unit.

In the preferred embodiment of the present invention, groups of program signals are digitally encoded and compressed, and the compressed program streams are time division multiplexed into digital transport streams. Each digital transport stream is modulated and/or upconverted into one wireless broadcast channel. The channel is broadcast to a number of receiving systems, at least one of which is shared by a number of living units.

The broadcast may utilize a portion of a landline network. A preferred broadcast technique utilizes wireless broadcast transmission.

In a wireless broadcast implementation, the wireless channel typically is an RF channel in the high end of the ultra high frequency (UHF) microwave range (e.g. 2.1 to 2.7 GHz), although other frequency channels could be used. Separately located transmitters simultaneously broadcast a UHF frequency signal containing all of the channels. The transmitter antennae are located and the transmitter emission patterns are designed so that the waves from the transmitters propagate throughout substantially overlapping portions of the service area.

The overlapping portions may extend throughout the intended reception area. Existing regulations relating to the relevant frequency allocations specify a primary service area and a secondary service area. Within the primary service area, the regulations protect the licensee from any interference on the relevant frequency channel. In initial implementations of the present invention complying with such regulations, the overlapping areas of propagation from the multiple transmitters would cover at least a major portion of the primary reception area and preferably also cover a substantial portion of the secondary reception area. Some portions of the secondary reception area may be covered by propagating waves from only one of the transmitters. All of the primary and secondary areas would be covered by propagating waves from at least one of the transmitters.

Figure 4:
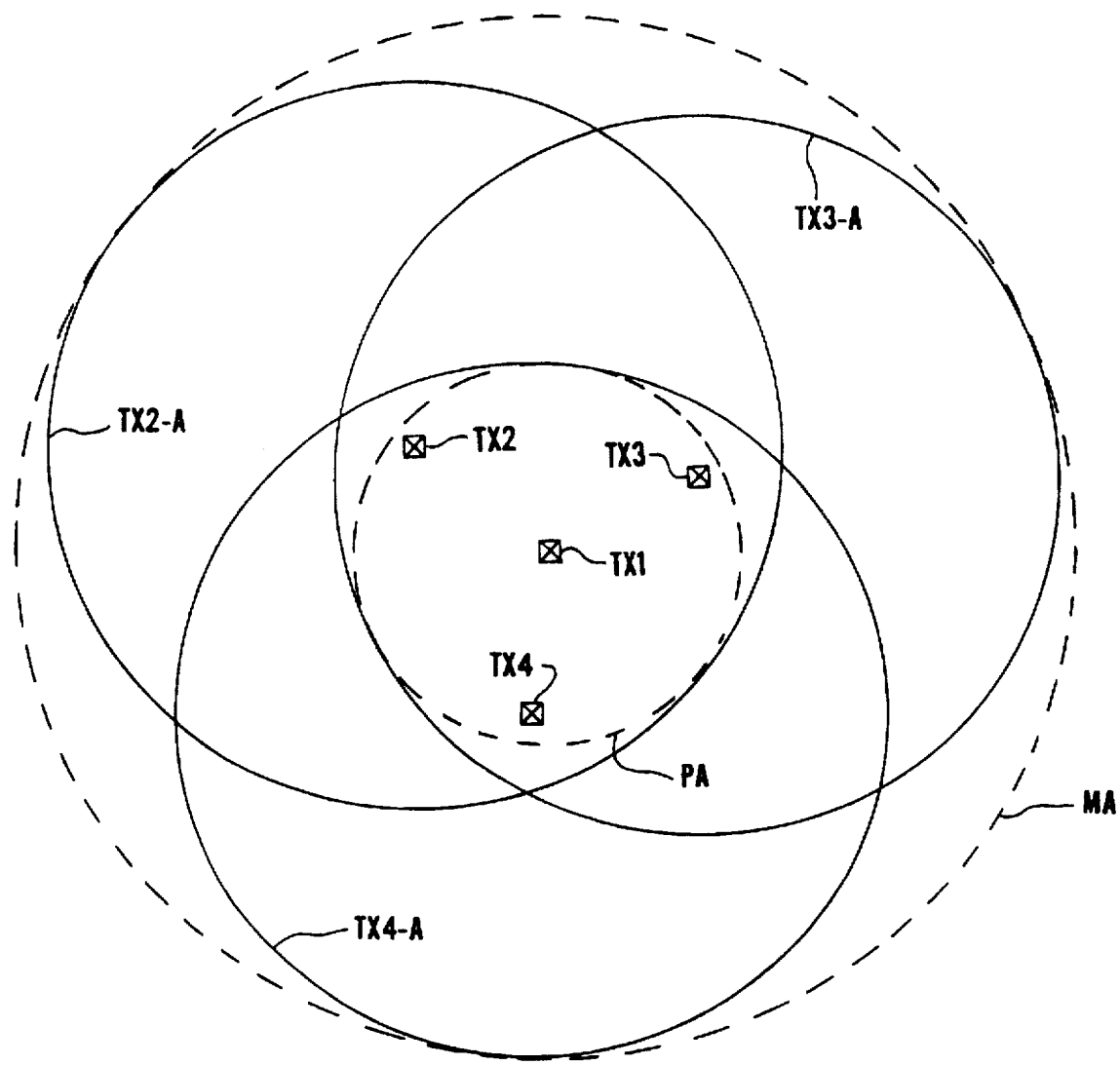
FIGS. 4 and 5 depict exemplary propagation areas for simulcast transmissions into a receiving area, in accord with one aspect of the present invention.

Referring to FIG. 4, the circle PA defines the Protected Area or primary area which may be serviced from a transmitting antenna TX1. At present, the radius of this circle is 15 miles. However, usable signal and acceptable reception generally occurs to a radius of 40 miles which is here defined by the circle MA indicating the Maximum Area. The region between the 15 mile radius circle and the 40 mile radius circle forms a 'secondary' service area. According to the invention, all or part of the rights of an educational institution for ITFS service are leased. Also, licenses are aggregated, from companies currently licensed to use MMDS channels. Existing analog services (both ITFS and MMDS) are replaced by the new service which will provide the original programming desired by the ITFS institution in addition to a multiplicity of programs made possible by the system and method of the invention. In order to achieve this end, simulcasting is utilized in a unique manner.

Figure 1:
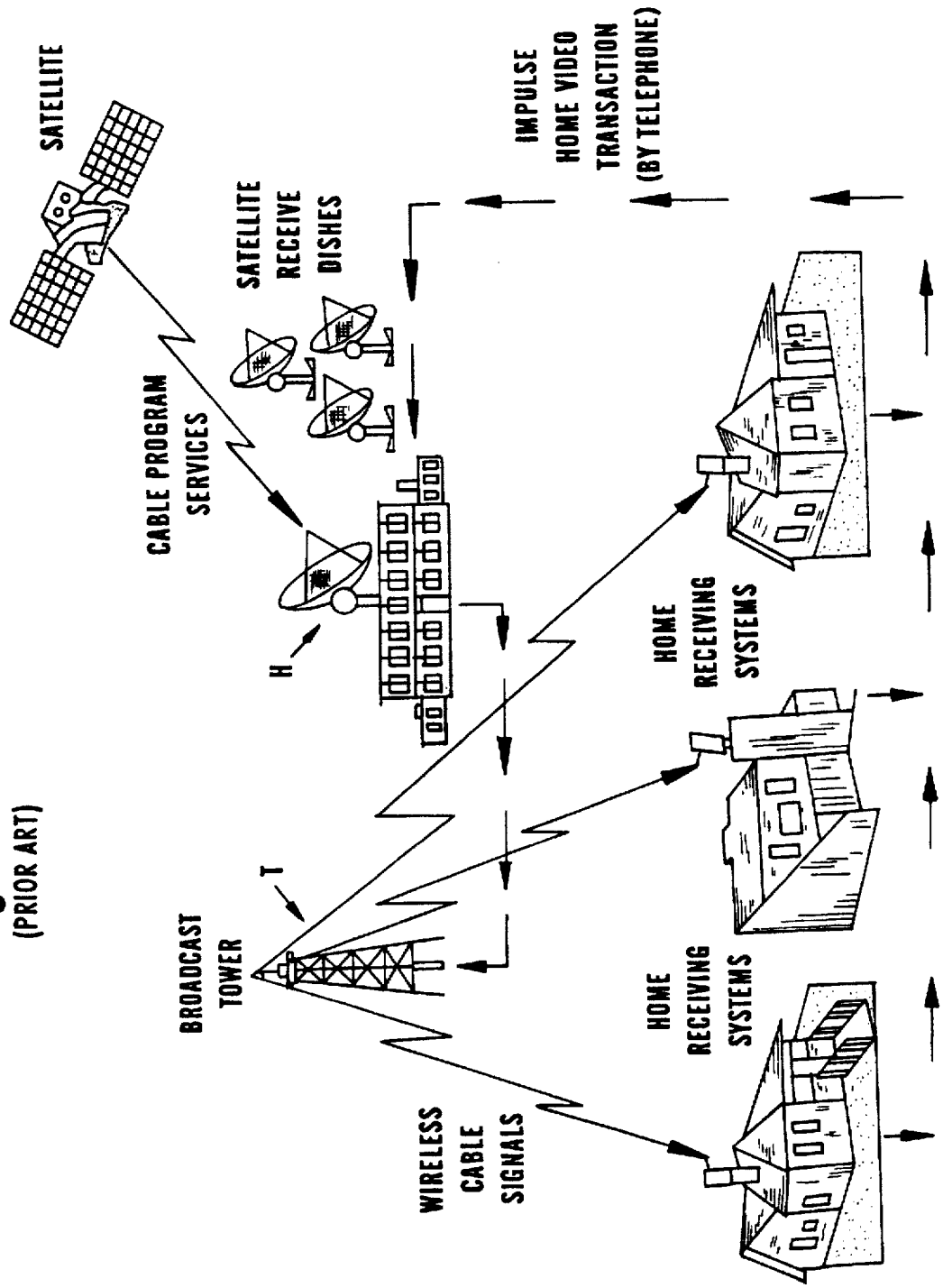
FIG. 1 is a simplified diagram of a prior art wireless cable television system.
Figure 1A:
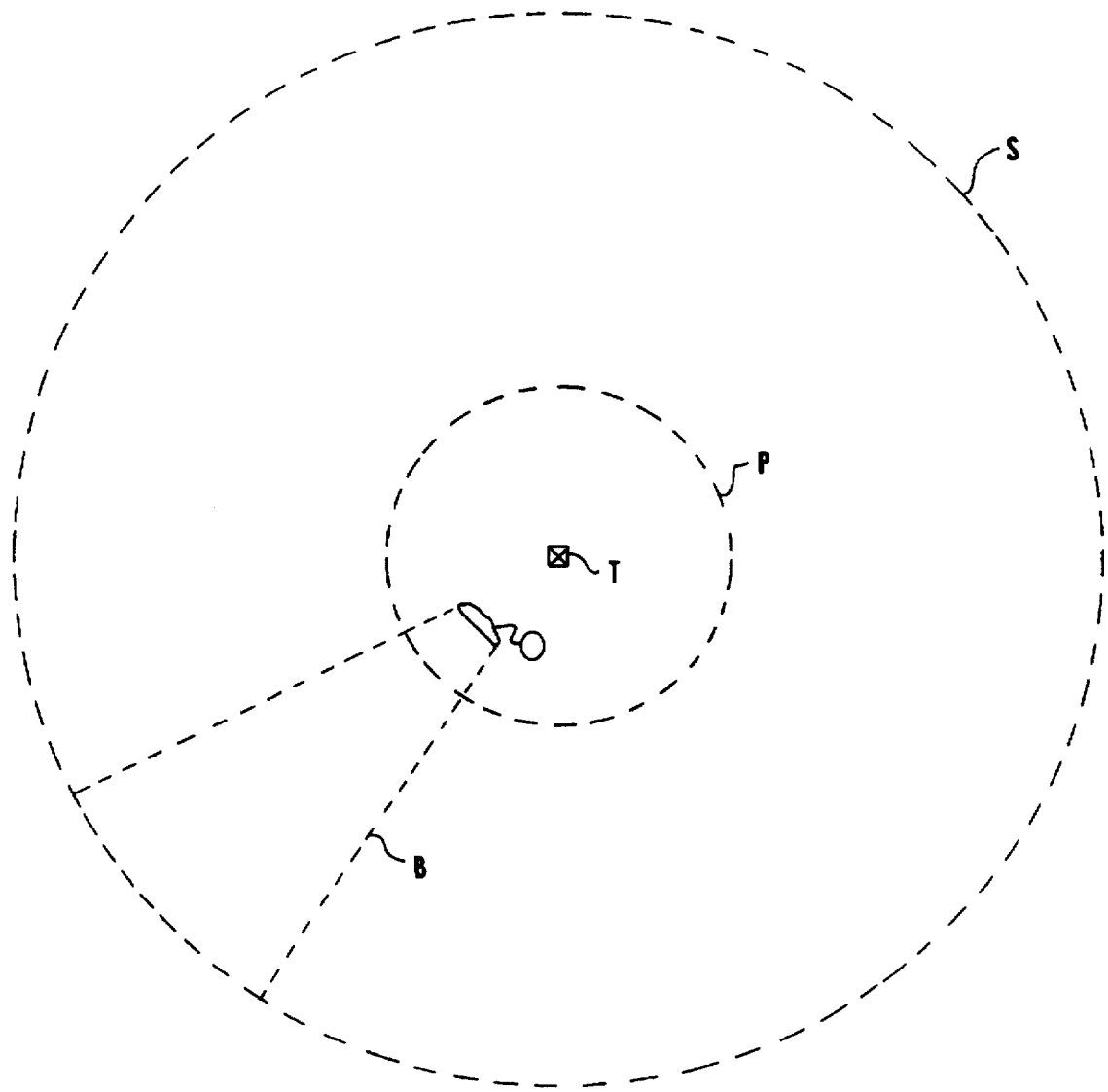
FIG. 1A shows service areas relating to a single wireless transmitter in the system of FIG. 1.

Referring to FIG. 4 there is shown one preferred embodiment of a simulcast arrangement utilizing the original antenna TX1 in addition to antennas TX2, TX3 and TX4 disposed in a generally triangular configuration within or on the boundary of the Protected Area (PA). According to this embodiment of the invention, all antennas radiate in an omni-directional pattern in azimuth as indicated by the circles TX2-A, TX3-A and TX4-A. The central antenna TX1 radiates out to the maximum area MA, in a manner permitted by existing regulations, as discussed above relative to FIG. 1A. A major portion of the protected area (PA) is overlapped by the signals from all antennas TX1, TX2, TX3 and TX4. In the Maximum Area (MA) considerable overlap continues to exist but to a lesser extent. In this manner it has been found possible to reach receivers in approximately 90–95% of the maximum area (MA).

Figure 2:
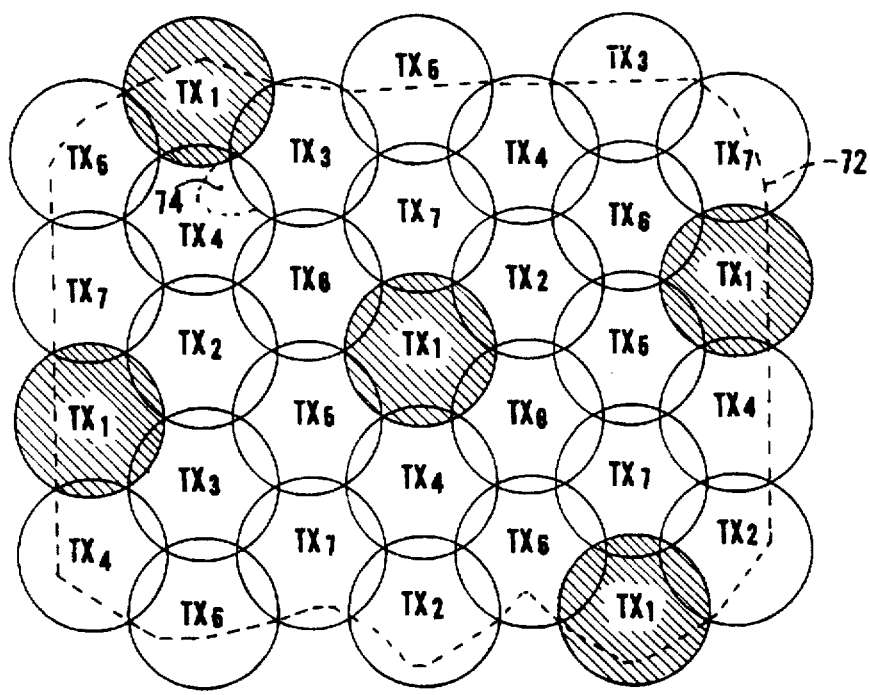
FIGS. 2 and 3 show propagation areas for multi-transmitter systems used in other types of prior art systems, e.g. paging.
Figure 3:
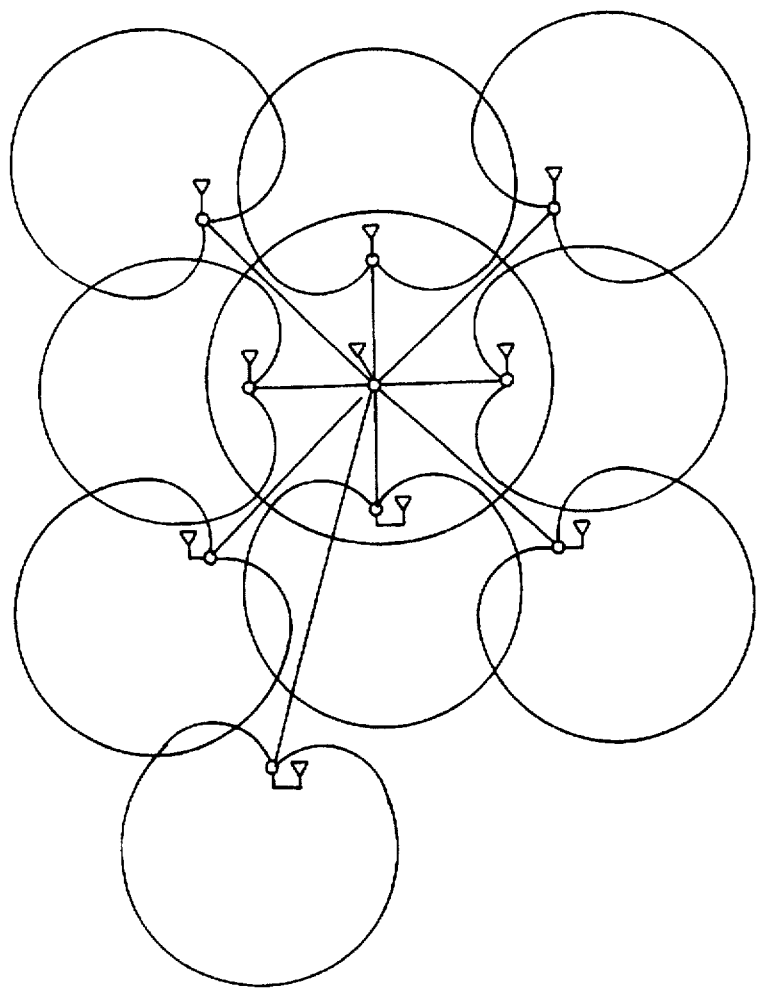
Figure 5:
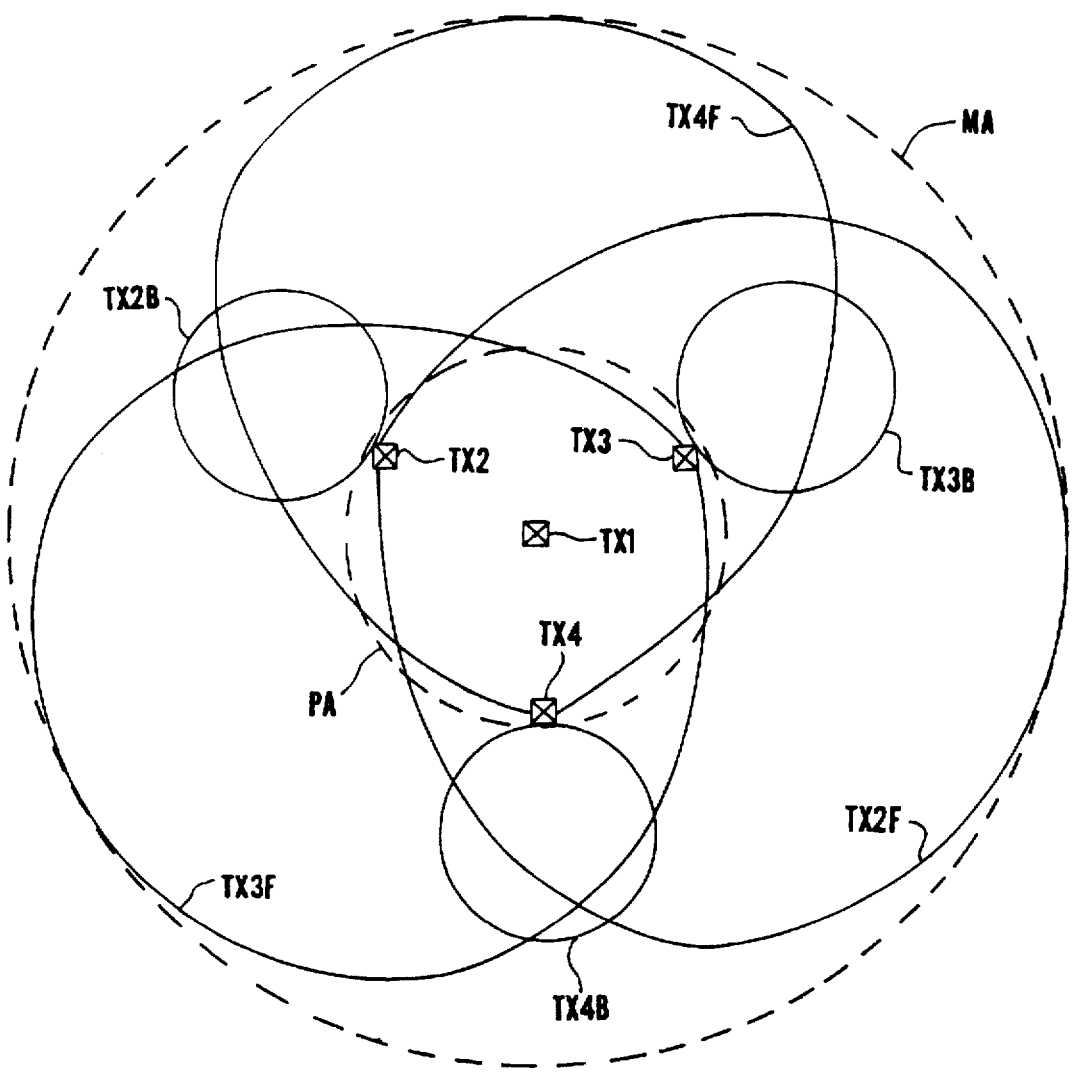

Referring to FIG. 5 there is shown a second preferred embodiment of simulcasting utilizing directional antennas TX2, TX3 and TX4. In this embodiment the central antenna TX1 retains its omni-directional pattern. However, the antennas TX2, TX3 and TX4 are provided as directional antennas radiating forward and backward lobes TX2F and TX2B for antenna TX2, TX3F and TX3B for the TX3 antenna and TX4F and TX4B for the TX4 antenna. In both the embodiments of FIGS. 4 and 5 it will be seen that there is a radical departure from the minimum overlap approach which is conventional in the systems illustrated in FIGS. 2 and 3.

The simulcast transmission from the broadcast antennae include a plurality of frequency multiplexed channels. Each channel contains a digital transport stream carrying a number of programs, in compressed digital form. The programs may be audio only programs, or data, but in the preferred embodiments, the programs are television type programs. The television type programs contain video and audio information, and may include data information, e.g. for closed captioning and the like. The system and method for transmitting the simulcast signals and receiving those signals within the service area are now briefly described.

Figure 6:
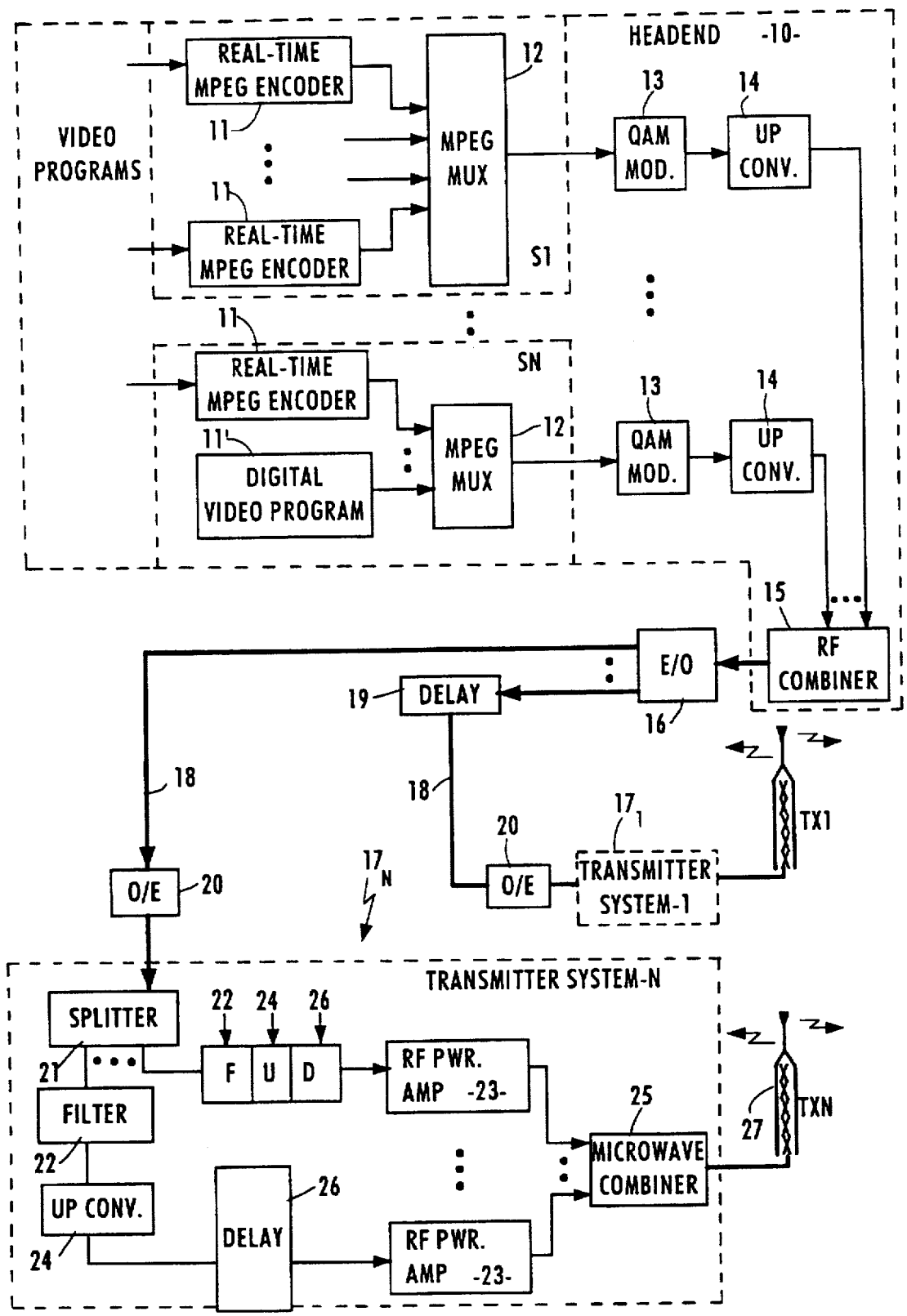
FIG. 6 depicts in functional block diagram form the elements of the wireless broadcast transmission system used in accord with the present invention.

With reference to FIG. 6, the broadcasting portion of the system includes a headend 10. The headend includes a number of Sources S1 to SX for producing digital transport streams, each of which contains a plurality of programs encoded as digital, compressed data. The number of such sources corresponds to the number of frequency channels available for use in a particular geographic region. Typically, the FCC licenses up to 33 channels of MMDS and ITFS services in a given area. It may be possible to aggregate rights to use all such channels, but to provide a commercially viable service, typically only 20–25 such channels are necessary. The headend 10 therefore typically comprises 20–25 of the Sources S1 to SX, but may include as many as 33 such sources. The Sources S1 to SX may convert analog program information from video sources, (e.g. off-the-air feeds, satellite receivers, VCRs, etc.) into compressed, digital data form. The headend 10 may also receive and process previously encoded material.

The video information, accompanying audio information and certain related data (if any) are encoded using a standardized digitization and compression technique, such as MPEG (moving pictures expert group) or DIGICIPHER™. The preferred embodiment utilizes MPEG II encoding. FIG. 6 illustrates the overall architecture of the broadcasting system. As part of the headend 10, that drawing provides a simplified diagram of the source encoder functionality, e.g. at S1, for preparing a group of original analog source signals for transport through the network. As shown, each analog television signal, e.g. in NTSC format, is applied to an MPEG encoder 11. The encoder 11 digitizes both audio and video for a program, and packetizes the compressed digital data in accord with the appropriate standard. The encoder may also encrypt the data before insertion thereof into the transport packets.

MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax. Information from previous video frames as well as later video frames is used in formulating the prediction. "Delta" or "B frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG II standard provides a standardized format for packetizing the compressed audio and video information and for transporting other data. Under the MPEG II standard, incoming individual video signals and related audio signals are encoded and packetized into respective Video and Audio Packetized Elementary Streams (PES). The video and audio PES's from one or more sources of video programming may be combined or multiplexed into a transport stream for transmission or storage.

Each frame of compressed program information (audio, video or data) is broken down into a series of transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mbits/s encoding system, a group of frames consisting of a total of 15 frames for one-half second of video (one I frame and a number of P and B frames), breaks down into approximately 2000 transport packets (or 4000 packets per second).

Each 188 byte transport stream packet consists of two sections, a 4 byte packet header section, an optional adaptation field and a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program or source from which they originate.

Periodically, the transport packet for each program will also include a program reference clock (PRC) value within the optional adaptation field. In a typical 6 Mbits/s MPEG encoding system, the PRC is present in at least 10 and preferably 20 out of every 4000 video transport packets, i.e. a relatively small number of transport packets.

When included, the optional adaptation field includes a section for miscellaneous flags, such as discontinuity counter, private data flag, etc. One of the possible flags carried in this portion of the adaptation field is a program clock reference (PRC) flag. The adaptation field (AF) also includes a section designated for AF options. One of the options this section may carry is the PRC value.

On decompression, the decoder in sequence reconstructs the frames for a particular program from packets bearing the appropriate PID value, uses the reference frame to form the prediction frames, and then uses the prediction frames and delta information to construct full frames from the delta frames. The decoder uses the PRC values to synchronize decoding to the original encoding operation.

The MPEG II standard facilitates time division multiplexing of MPEG packets from a plurality of programs. In the present system, the encoders 11 supply MPEG packet streams for multiple programs to an MPEG multiplexer 12. The number of programs may vary depending on the bandwidth. The MPEG multiplexer 12 may receive digitized and compressed (MPEG) video from other sources 11'. Typical digital sources 11' include digital server (storage) systems and digital video transmission systems (e.g. satellite or optical fiber).

As discussed below, a typical multiplexed digital transport packet stream used in the present invention has 27 Mbits/s of payload capacity. A mixture of program streams for individual programs at different individual rates, e.g. 1.5 Mbits/s, 3 Mbits/s and 6 Mbits/s, may be combined to fully utilize the 27 Mbits/s capacity. In one example, the 27 Mbits/s multiplexed digital transport packet stream might consist of three 3 Mbits/s programs and three 6 Mbits/s programs. For simplicity of further discussion, however, assume encoding of programs at a 6 Mbits/s rate, therefore the multiplexer 12 combines four MPEG II packet streams of four such programs for output on each broadband rail.

The simplified example therefore provides four programs for one RF channel, i.e. a 4 to 1 improvement over the existing single analog program channel. The other mix of three 6 Mbits/s programs and three 3 Mbits/s programs provides six programs for one RF channel, i.e. a 6 to 1 improvement. Lower bit rates and/or more efficient modulation techniques can further extend the program capacity provided through each RF channel.

In a typical example, there are at least three PID values for packets of a particular television type program encoded in MPEG II form, a first PID value for packets containing video, a second PID value for packets containing audio and another PID value for a packet containing a program map. There often are more than three PID's associated with the packets containing programming from one source. For example, there could be a data channel associated with the program which would include data for closed captioning for the hearing impaired and/or related control signaling information. There could be a number of audio elementary streams, for example, carrying respective different language audio tracks. The program map, in turn, specifies the PID values for the various packets containing video, audio and/or data from the particular source.

In a combined MPEG packet stream carrying packets for two or more programs, the PID values for each program will be unique, and each such program is assigned a unique program number (PN). For example, HBO might have a program number '1', and the program map for HBO might be found in packets corresponding to PID 132. Showtime might have a program number of '2', and the program map for Showtime might be found in packets identified by PID 87 and so forth. The program map for HBO in the packet with PID 132 would then identify the PID numbers for the actual packetized elementary streams (PES) for the video, audio and data (if any) channels associated with the HBO program. The program map for Showtime in the packet with PID 87 would then identify the PID numbers for the actual packetized elementary streams (PES) for the video, audio and data (if any) channels associated with the Showtime program.

The MPEG II standard also requires that a packet stream containing packets relating to one or more programs includes a program association table in a packet identified by PID 0. The program association table maps each program number with the PID value associated with the program map related to that source. In accord with the standard, each MPEG II multiplexer 12 combines MPEG packet streams for the four (or more) input programs and adds a PID 0 packet containing the program association table to the combined stream. In the above example, the program association table would map program number '1'(HBO) with PID value 132 indicating that the program map for HBO is contained in repeating packets identified by PID 132. Similarly, the program association table would map program number '2'(Showtime) with PID value 87 indicating that the program map for Showtime is contained in repeating packets identified by PID 87.

A decoder can receive and process material relating to one program in a transport stream using the program and the program number (PN). In such an implementation, the MPEG decoder uses the information contained in the PID 0 packet to identify the PID value for the program map for the particular desired program, e.g. 132 in the above HBO example, and uses the program map to identify the PID values needed to capture the video, audio and user data (if any) for the desired program. Alternatively, the decoder may be supplied with PID value information for the actual video stream, audio stream and data stream (if any) associated with the program, e.g. from a table in memory or from information received via a separate signaling channel. However, even if the decoder does not utilize the program association table and the program maps, these packets are included in the MPEG transport streams output by the multiplexers 12 to insure full compliance with the MPEG II syntax.

In the present embodiment, each multiplexer 12 outputs a group of MPEG encoded programs, i.e. four if the encoding rate of all encoders 11 is 6 Mbits/s, at a combined payload rate of 27 Mbits/s (it may be necessary to pad the steam with dummy packets to reach the full 27 Mbits/s). The actual stream will include an additional 3 Mbits/s of forward error correction information for a combined rate of 30 Mbits/s, although hereinafter for convenience the bit stream is generally described by its 27 Mbits/s payload rate.

The 27 Mbits/s payload (actually 30 Mbits/s including forward error correction bits) baseband digital output of each MPEG multiplexer 12 from one of the sources S1 to SX goes to a modulator 13. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard 6 Mhz channel allocation for transmission over a cable television type distribution network. The currently preferred implementation uses 64 QAM (quadrature amplitude modulation) or 16 VSB (vestigial sideband) modulation techniques in the modulators 13. Using 64 QAM, 4 channels of 6 Mbits/s or a mix of 1.5, 3 and 6 Mbits/s encoded digital video information up to a total of 27 Mbits/s together with 3 Mbits/s of forward error correction information can be modulated into one 6 Mhz bandwidth analog channel. Similarly, 256 QAM or 16 VSB would yield up to 40 Mbits/s payload of capacity (not counting bits added for forward error correction), e.g. for 6 channels of 6 Mbits/s or mixes of the various rate encoded digital video information modulated into one 6 Mhz bandwidth analog channel. Each modulator 13 produces a 6 Mhz bandwidth output at an intermediate carrier frequency.

Each modulator 13 outputs the intermediate frequency signal to an individual upconverter 14. The upconverter converts the frequency of the QAM modulated signal up to one of up to thirty-three RF channel frequencies in the 50–450 Mhz range. The upconverter 14 may be an element of the QAM modulator 13 or a separate element as shown hard wired to process the output of the QAM modulator. Each upconverter 14 outputs a different 6 MHz bandwidth RF channel to an RF combiner 15 for combining with the other 6 MHz RF signals from the other upconverters 14. The RF combiner 15 thereafter outputs the combined RF signals in the normal video channel range of approximately 50–450 Mhz. The upconverters 14 and the RF combiner 15 may be the same as components currently used for RF signal processing in cable television systems. Broadcast channels of this type can ride on a landline broadband distribution network, e.g. a cable broadcast network or a hybrid-fiber-coax network similar to networks used as cable TV systems.

For the preferred wireless type broadcast system, a transmission network supplies the combined spectrum signal in the 50–450 MHz range from the combiner 15 to a number of wireless broadcast transmitter systems $17_1$ to $17_n$. The transmitter systems $17_1$ to $17_n$ correspond to the transmitters TX1 to TX4 described above with respect to FIGS. 4 and 5. Although coaxial cable, wireless microwave relay transmissions or other media could be used, in the preferred embodiment, the transmissions from the headend 10 ride on optical fiber lines 18. In the preferred embodiment, an electrical to optical converter system 16 converts the signal from combiner 15 into optical signals for transmission over a plurality of optical fibers 18. An optical to electrical unit 20 at each transmitter site converts the optical signal back to the combined electrical signal and supplies that signal to one of the transmitter systems 17.

An important feature of the present invention relates to simulcasting, i.e. simultaneous broadcasting, of the combined spectrum UHF signal from a plurality of and possibly all of the transmitter towers TX1 to TXN. The optical fiber signal transmission from the headend 10 to the transmitter systems requires some finite amount of time. Typically, the transmitter systems will not be equi-distant from the headend. In fact, one of the transmitter systems may be in the same building as the headend. To insure substantially simultaneous broadcasting, the system shown in FIG. 6 therefore includes some form of delay 19 in one or more of the transport lines 18. The delay may take the form of coils of fiber to equalize the optical transport paths and therefore the time through each path. Alternatively, one or more electronic delay devices may be imposed in the relevant paths, either at the headend prior to optical transport or at the respective transmitter location subsequent to conversion back to electrical signal form.

There may be as few as two transmitters. In a typical example, there will be a central transmitter site TX1 and two or three other transmitter sites TX2, TX3 and TX4 at various locations about the primary reception area (see e.g. FIGS. 4 and 5). The headend may be close to the central transmitter site TX1, therefore the transport distance to that site would be the shortest. Assume now, for example, that TX4 is the longest distance from the headend. To provide an actual simultaneous broadcast, the delay produced by delay device 19 will be equal to the difference in the time required to transport optical signals from the headend 10 to those two sites, i.e. so as to result in simultaneous in-phase transmission of the exact same signal from the antennae at the two transmitters TX1 and TX4. Similar delays are imposed in the lines 18 to the other transmitter systems. Alternatively, at least two transmitters on the periphery may transmit substantially simultaneously, whereas one or more of the other transmitters (e.g. the central transmitter) may broadcast the signal at a predetermined time prior to the transmissions on the periphery to provide a precise time offset.

FIG. 6 also shows details of one of the wireless transmitter systems 17N, by way of an example. Each transmitter system includes a splitter 21. The splitter 21 together with associated channel selection filters 22 divide the received combined signal (50–450 MHz) into its constituent 6 MHz wide RF channels. For each 6 MHz channel in the 50–450 MHz range, one of the upconverters 24 converts that channel into one of the up to thirty-three available (licensed) channels in the UHF microwave range. An RF power amplifier 23 amplifies each UHF channel.

A delay device may process each channel signal, and by way of example, FIG. 6 shows a delay device 26 processing the output of each of the upconverters 24. The delay devices 26 provide precise delay compensation on each respective channel to compensate between variations in throughput processing time of the various components at different transmitter sites operating on the signal to be broadcast on a particular microwave channel.

A microwave combiner 25 combines the UHF channel signals back into a combined spectrum signal in the UHF range and supplies that signal to a microwave broadcasting antenna 27. Each transmitting antenna may be an omnidirectional antenna or a directional antenna. The type of antenna at each transmitter site is selected to give the optimum coverage in a particular geographic service area. The antenna 27 emits UHF waves to propagate through a portion of the service area. For each channel, the resultant broadcasts from all of the transmitters are synchronized and in phase with each other. The transmitted microwave signals propagate into substantially overlapping portions of the service area and into some non-overlapping portions of that area, for example in patterns such as shown in FIGS. 4 and 5.

The above discussion of the headend and transmission systems is one example of an overall system for providing the preferred simultaneous, synchronized, in-phase broadcasts from multiple transmitters having substantially overlapping propagation areas. Other headend and transmitter systems could be used. For example, the headend 10 could perform the digital multiplexing, and the transport network to the transmitters TX1 to TXN could carry the multiplexed transport streams in digital form. In such a case, the individual transmitter systems would further include at least the QAM modulators for each RF channel. In such a system, the transmitters may include means to synchronize processing and broadcast transmissions to some common clock, e.g. from a geo-positioning type satellite system, to achieve the simulcast transmission.

Figure 7:
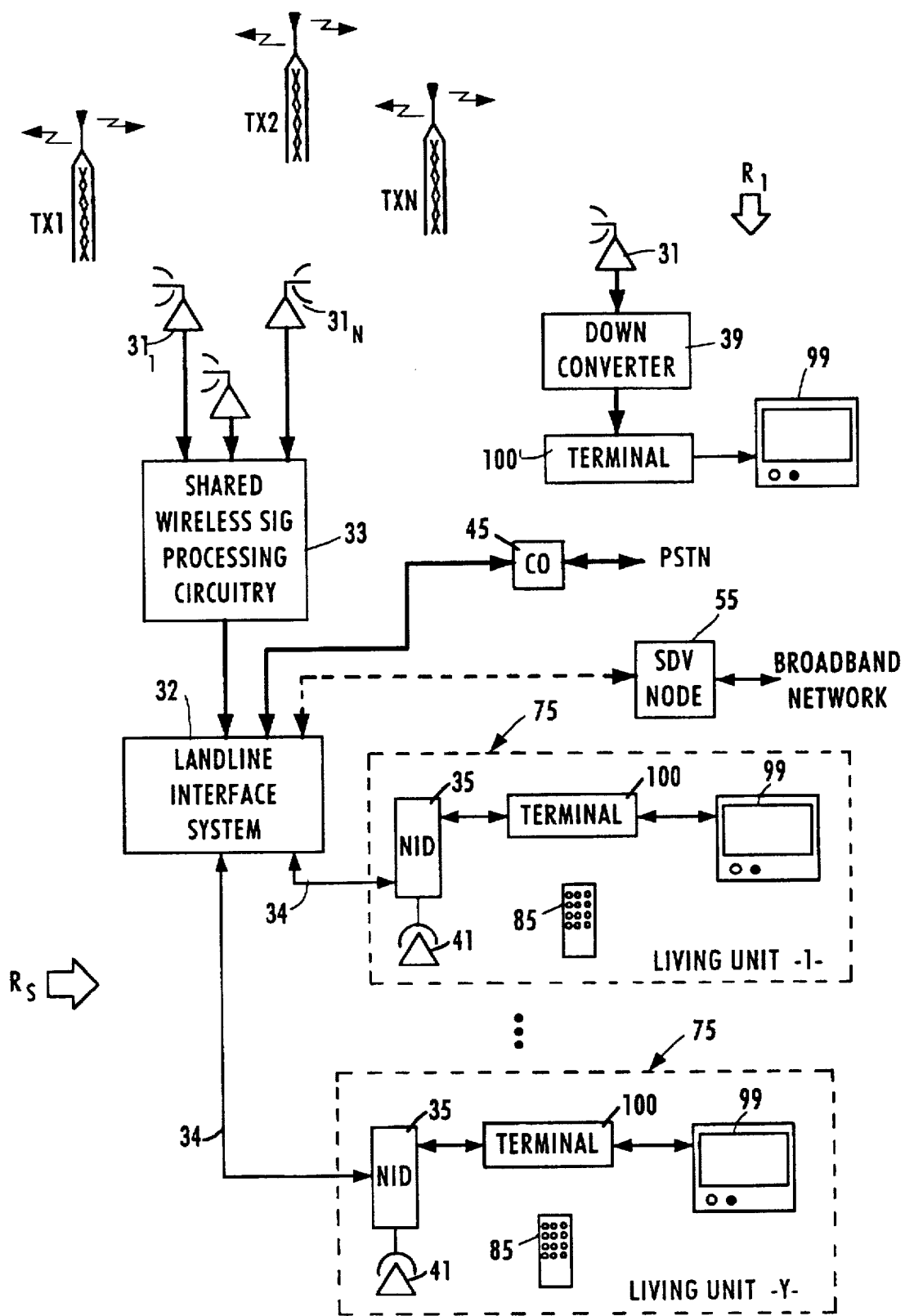
FIG. 7 illustrates the high-level functional elements of a customer premises receiver system and a first preferred embodiment of a common or shared receiving system in accord with the present invention.

FIG. 7 provides a high-level functional diagram of the receiving systems used in the present invention.

In accord with the invention, a group of users or locations will have a shared receiving system $R_s$. The users could be in different rooms or living areas (units) within one customer premise. In most cases, however, the shared system services living units occupied by different users, e.g. tenants in hotel rooms, apartments or the like. In this first embodiment, the subscribers telephone loops 34 serve as the video drops carrying selected program signals to terminals in the living units serviced by the shared system.

The shared receiving system includes at least one and typically a plurality of directional microwave antennae, aimed at one of the transmitters TX1 to TXN. In the preferred implementation, the system $R_s$ includes the same number of microwave receiving antennae $31_1$ to $31_N$ as there are transmitters TX1 to TXN serving the region. In such a preferred system, one of the microwave receiving antennae $31_1$ to $31_N$ is aimed at each of the transmitters TX1 to TXN. This arrangement provides angular diversity in the broadcast waves received through these antennae. Because of the shared use by multiple customers, the size, gain and quality of these antennae can be relatively high. Also, since there is only one set of antennae, presumably, the antennae can be placed at one or more sights on community property or on the top of the apartment building where the group of customers reside.

The microwave receiving antennae $31_1$ to $31_N$ may be mounted on a relatively high mast to provide clear line-of-sight reception from all of the transmitters serving the region. Alternatively, the antennae $31_1$ to $31_N$ may be located at different vantage points around the development. In a single family home community or in a town house development for example, each individual microwave antenna could be located on a different home, as agreed by the home owners, so as to provide line-of sight reception from the desired one of the transmitters TX1 to TXN. For example, one home at one end of the development may have a clear line-of-sight to one transmitter tower, a second home at the other end of the development may have a clear line-of-sight of the second transmitter, etc. Antennae located on those homes are connected to the shared processing circuitry 33. On an apartment or hotel building, each individual antenna could be located at a different one of the corners of the building, so as to provide the necessary line-of sight reception from the desired one of the transmitters TX1 to TXN.

Signals from the microwave receiving antennae $31_1$ to $31_N$ all go to shared wireless signal processing circuitry 33. The shared wireless signal processing circuitry 33 processes the signals from the microwave receiving antennae $31_1$ to $31_N$ to produce a single high quality RF spectrum signal downconverted into at least a portion of the 50–450 MHz range from the microwave transmissions. Exemplary systems for use as the shared wireless signal processing circuitry 33 are disclosed in detail U.S. patent application Ser. No. 08/441,977 filed May 16, 1995 entitled "SHARED RECEIVING SYSTEMS UTILIZING TELEPHONE CABLES AS VIDEO DROPS" (attorney docket no. 680-130B), and the disclosure of the shared wireless signal processing circuitry from that application is incorporated herein in its entirety by reference.

The shared wireless signal processing circuitry 33 outputs the processed channel signals through a coaxial cable or the like to a landline interface system 32. The landline interface system also connects to a telephone company central office 45, e.g. through a subscriber line carrier system (not shown in detail). The landline interface system 32 may also provide a connection to a node 55 of a landline based broadband network, such as a switched digital video (SDV) network. The landline interface system processes all received broadcast signals from the wireless transmission (and from the SDV node if so connected) to derive separate signals for each individual broadcast program and supplies selected signals over the telephone loops 34 to the individual living units 75.

In an apartment building or hotel, the landline interface 32 typically is located in the telephone wiring closet. In a housing development, the landline interface 32 typically occupies a binding post distribution cabinet, e.g. in a controlled environmental vault.

The landline interface system 32 provides a downstream interface for selected channels from the output of the shared wireless signal processing circuitry 33 to the telephone lines 34 serving the living units 75. The telephone wiring may include optical fiber, coaxial cable etc., but typically, the telephone wiring consists of twisted wire copper pairs. At least one such pair goes from the landline interface 32 to each living unit 75.

The landline interface system 32 also interfaces the telephone wiring 34 to the lines or trunks to the CO 45 to provide subscribers with plain old telephone service (POTS). The CO 45 in turn connects to other elements of the public switched telephone network (PSTN), in the normal manner.

Each living unit 75 includes a network interface device (NID) 35 connected to a respective telephone line 34. The NID 35 provides one or more telephone devices 41 with a two-way voice band connection to the line 34. Although shown as telephones, the telephone devices 41 may comprise any devices compatible with ordinary telephone lines, e.g. facsimile machines, modems, etc. The NID 35 also provides a two-way connection to a terminal 100, utilizing specific higher frequencies discussed below with regard to FIG. 7A.

The terminal 100 responds to subscriber input signals, e.g. from a wireless remote control device 85. The terminal 100 transmits a packetized data message through the NID 35 and the telephone line 34 upstream to the landline interface 32, for example, indicating a newly entered program selection.

In operation, the landline interface system will supply a selected program signal, as a single program MPEG II transport stream modulated on an appropriate channel for twisted wire pair transport. The landline interface system 32 transmits the modulated signal for a requested program through the telephone line 34 and the NID 35 to the terminal 100 in the living unit 75 of the requesting subscriber. Each terminal 100 includes an appropriate demodulator and a digital decoder (see FIG. 10) to convert the received signal to a signal compatible with the television 99. The TV 99 presents the program to the viewer in sensorially perceptible form, in this case, as a standard audio/visual output.

The simulcast wireless transmissions in accord with the present invention will also service customers not associated with a shared receiving system, such as the system $R_r$. Such other customers will have their own wireless receiving system $R_1$. For example, if such a customer is a home owner, that customer's system $R_1$ would include a small dish type directional antenna 31, a block downconverter 39 and a coaxial distribution system connected to one or more terminals 100' (only one shown).

Typically the antenna 31 is an elliptical dish shaped antenna 18 inches or less in diameter, formed of parallel curved elements. The dish 31 is aimed at the one transmitter TX1 to TXN which produces the strongest received signal through the antenna at the subscriber's particular location. The receiving antenna 31 supplies the 2.1 to 2.7 GHz spectrum (through appropriate filtering and/or amplifiers not shown) to the block downconverter 39.

The block downconverter 39 converts the 2.1 to 2.7 GHz signal, containing all of the wireless broadcast channels, back down to the video channel band of 50–450 MHz. The block downconverter supplies the 50–450 MHz combined spectrum signal via a coaxial cable to one or more terminal devices 100' located at various places in the subscriber's home. The single residence system may have only one terminal, but in many instances, the signals will be distributed to up to four terminals located throughout the home at desirable television viewing locations.

The terminal 100' in the residential system $R_1$ typically includes an interface module and a digital signal processor. In the single residence system $R_1$, the interface module functions as a wireless signal processor to process a selected one of the 6 MHz channels and recover the digitally multiplexed transport stream carried in that channel. The digital signal processor 37 processes data packets for the selected program from the multiplexed stream to produce signals to drive the TV 99. The TV 99 presents the program to the viewer in sensorially perceptible form, again as a standard audio/visual output. Commonly assigned copending U.S. patent application Ser. No. 08/405,558 filed Mar. 16, 1995 entitled "SIMULTANEOUS OVERLAPPING BROADCASTING OF DIGITAL PROGRAMS" (attorney docket no. 680-130) provides a more detailed disclosure of the receiving system and terminal structures used in a single living unit type installation, and the disclosure thereof from that application is incorporated herein in its entirety by reference.

In each of the receiving systems, each antenna is aimed at one of the transmitters TX1 to TXN. Even so, the antenna receives multiple copies of the transmitted waveform signals. These multiple copies or replicas include a primary direct line-of-sight transmission of a signal from the transmitter the antenna is directed towards together with delayed copies (typically delayed and distorted) caused by reflections of the transmissions from one or more of the multiple broadcast sites. Also, at locations in the secondary reception area, the direction of reception by the antenna may actually be substantially in line with two of the transmitters. In such a case, the antenna would receive a first copy of the combined spectrum transmission from the closest transmitter followed by a delayed copy transmitted from the more distant of the two aligned transmitters.

The present invention therefore contemplates inclusion of some form of delay processing in the receiver to compensate for the reception of multiple delayed copies of the transmitted program signals. The presently preferred embodiment utilizes a delay equalizer as described in the above-incorporated commonly filed U.S. application Ser. No. 08/405,558. As an alternative, the processing circuitry could utilize spread spectrum technology, as discussed in more detail in commonly assigned U.S. patent application Ser. No. 08/405,685, filed Mar. 17, 1995 (attorney docket no. 680-117) entitled "Television Distribution System and Method," the disclosure of which is incorporated herein in its entirety by reference. As discussed more fully below, the delay processing circuits, e.g. delay equalizers, are provided as elements of the landline interface system 32 in the shared receiving system $R_r$.

Figure 7A:
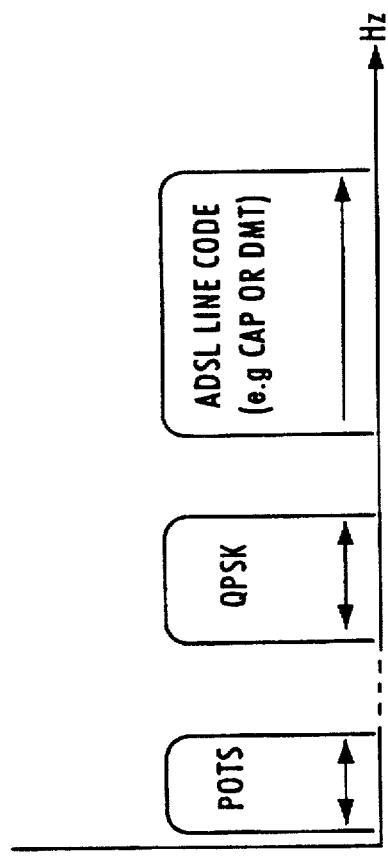
FIG. 7A is a spectrum diagram (not to scale) of the frequency channelization on a telephone loop in the shared receiving system illustrated in FIG. 7.

One example of a frequency channelization for use on a twisted wire pair type telephone loop 34 appears in FIG. 7A. In the illustrated example, the POTS signals for two-way voice frequency communication utilize a two-way channel in the 300 Hz to 4 kHz range. This is essentially standard POTS telephone service. A higher frequency channel provides analog modulated transport for a digital transport stream representing a single selected program. The downstream broadband channelization is similar to that used in Asymmetric Digital Subscriber Line (ADSL) system, and similar modulation techniques are used (e.g. CAP, DMT or the like). The frequency allocation on the loop 34 also provides at least a one-way (upstream) signaling channel. In the preferred example illustrated in FIG. 7A, a two-way signaling channel is provided between the broadband downstream channel and the low frequency POTS channel. The signaling channel carries packetized data communications using QPSK modulation. Persons skilled in the art will recognize that a variety of frequency values can be used for the various channels shown in FIG. 7A.

Figure 8:
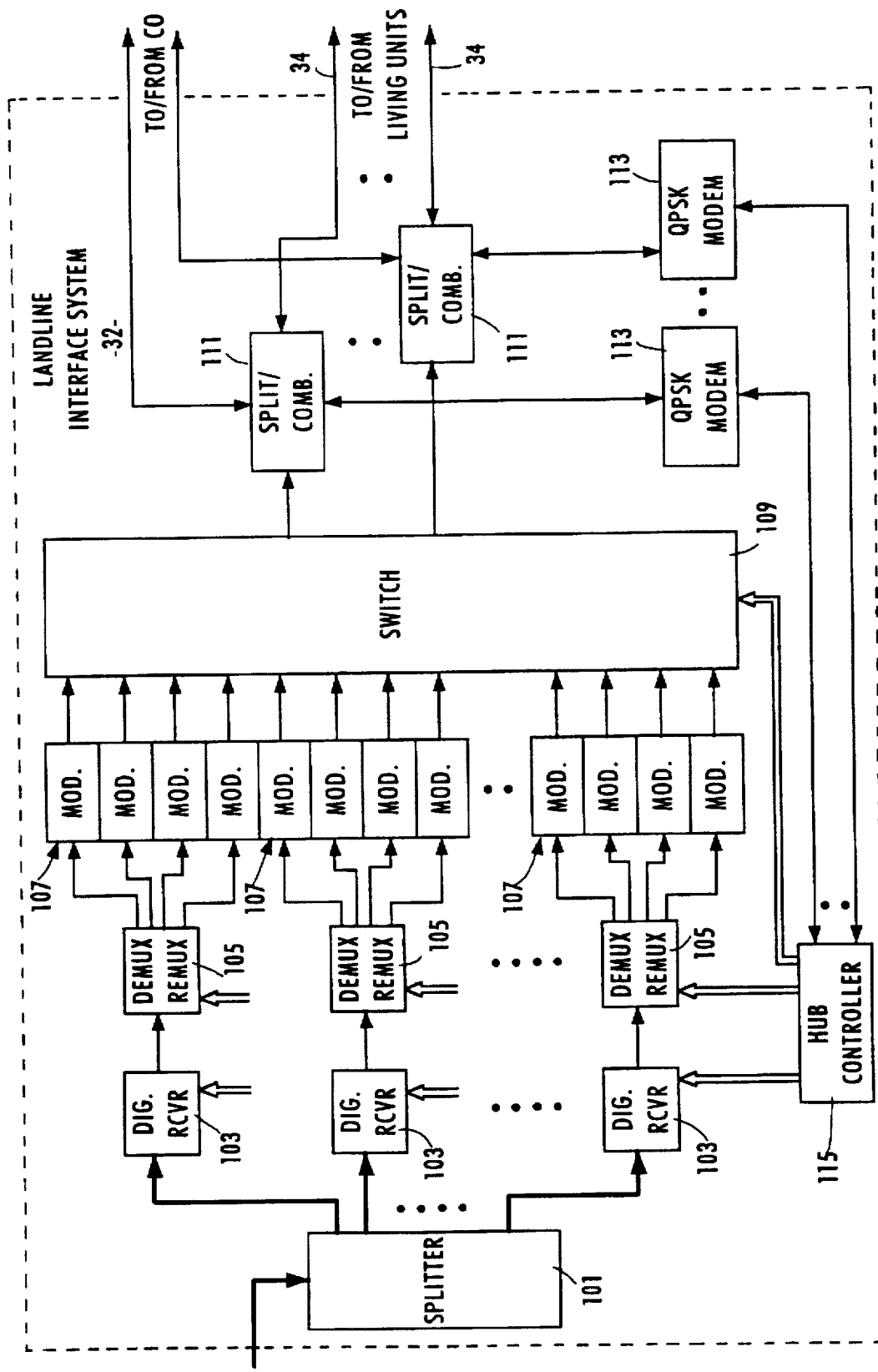
FIG. 8 is a more detailed functional block diagram of a landline interface system used in the shared receiving system illustrated in FIG. 7.

FIG. 8 illustrates the functional elements of an exemplary implementation of the landline interface system 32. For simplicity of discussion, it is assumed here that the landline interface system 32 receives only broadcast signals from the wireless broadband transmission system of FIG. 6. The illustrated system 32 therefore includes processing elements to derive a digital transport stream for each wireless broadcast program. Additional processing circuitry (not shown) would be provided to derive signals for programs supplied through the SDV node 55 (FIG. 7).

A splitter 101 receives the combined spectrum signal in the 50–450 MHz range via the coaxial cable, directly from a downconverter in a single receiving antenna installation or from the shared wireless signal processing circuitry 33 in a multiple receiving antenna implementation such as that shown in FIG. 7. The splitter supplies the combined spectrum signal to each of a plurality of digital receivers 103.

The landline interface system 32 includes at least one digital receiver 103 for each of the broadcast channels received by the system 32. In operation, one digital receiver 103 processes each single one of the broadcast channels contained in the 50–450 MHz signal.

One or two additional digital receivers may provide a level of redundancy, i.e. so that a spare receiver may be activated to replace an inoperative receiver. Each digital receiver connects to an associated 'Demux/Remux' circuit 105, and each 'Demux/Remux' circuit 105 in turn connects to a bank of modulators 107. Corresponding spare 'Demux/Remux' circuits 105 and modulators 107 would be provided with the spare digital receivers.

Each digital receiver selects one broadcast channel and processes that signal in the frequency spectrum for that channel to capture the transport stream therefrom. In the implementation discussed above, the transport stream is a 27 Mbits/s digital signal. The digital receiver performs the demodulation, forward error correction, etc. to recover the transport stream from the selected 6 MHz wide channel in the 50–450 MHz range received via the coaxial cable. Each digital receiver 103 supplies a 27 Mbits/s transport stream, containing a plurality of programs to a digital signal processor identified as a 'Demux/Remux' circuit 105.

The Demux/Remux circuit 105 separates out a digital stream for each individual program carried in the broadcast transport stream. In the preferred implementation under consideration here, the broadcast transport stream at 27 Mbits/s contains four programs, each encoded at a 6 Mbits/s rate. Each Demux/Remux circuit 105 therefore outputs four new digital transport streams each containing packets for a single program together with overhead packets to conform to the MPEG II syntax at a combined rate slightly higher than 6 Mbits/s.

Figure 9:
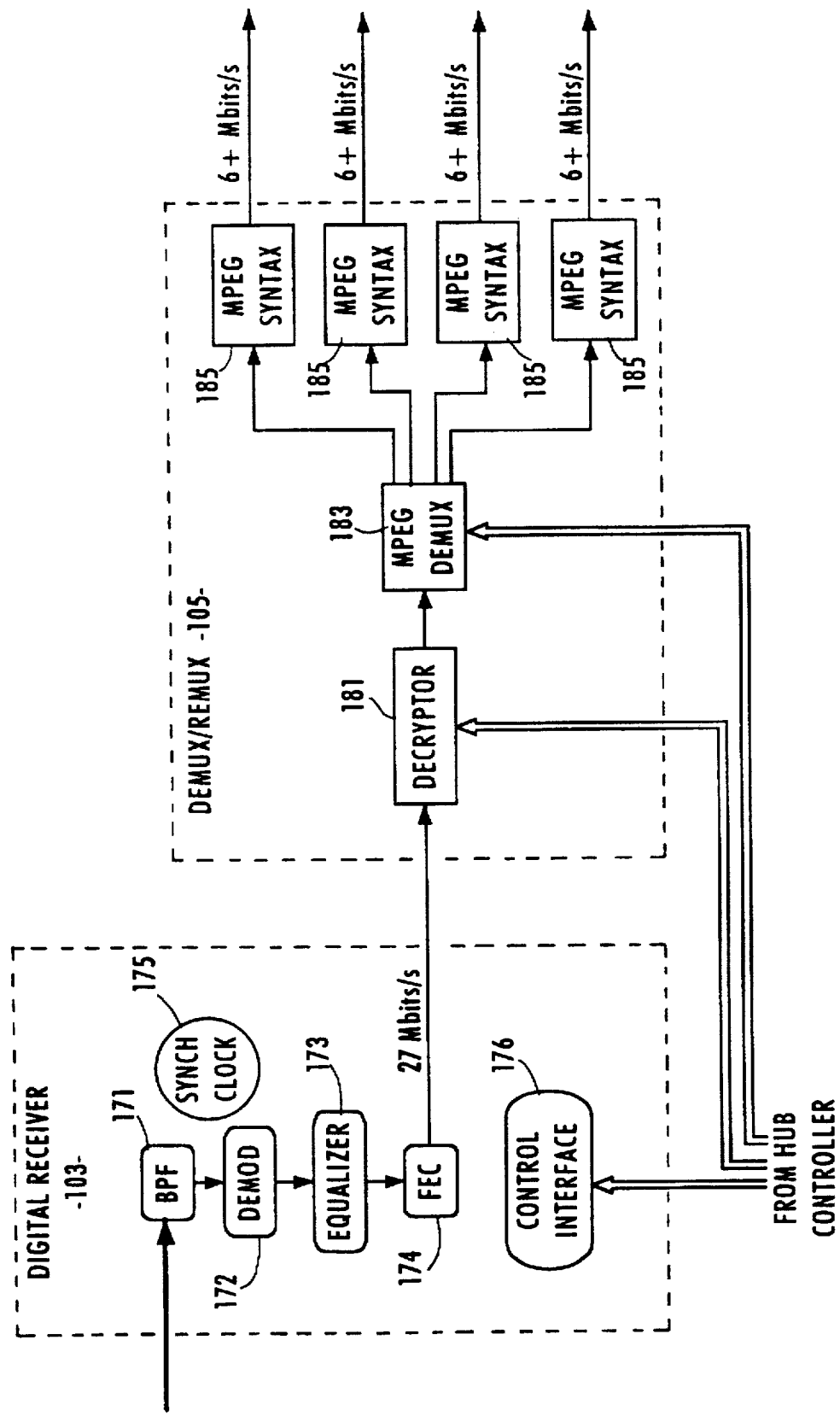
FIG. 9 is a functional block diagram of the digital receiver and the demultiplexer/remultiplexer used in the landline interface system of FIG. 8.

FIG. 9 shows the elements of one digital receiver 105 and associated Demux/Remux circuit 105 in somewhat more detail.

The digital receiver 103 includes a band-pass filter 171. The bandpass filter 171 selects one of the broadcast channels from the received 50–450 MHz spectrum signal supplied through the splitter 101. The bandpass filter 171 may be a fixed frequency filter. At least for those digital receivers used as back-up units, the bandpass filter 171 comprises a frequency selective tuner, permitting tuning to the channel normally processed by a temporarily out of service receiver 103.

The bandpass filter 171 supplies the selected frequency channel portion of the received spectrum to a demodulator 172. The demodulator 172 demodulates the received channel spectrum, using a demodulation technique corresponding to the modulation used in the particular broadcast headend (e.g. 64 QAM).

The digital receiver 103 also includes, a time domain adaptive digital equalizer 173 and forward error correction circuitry 174. A clock circuit 175 provides synchronization for the digital output of the demodulator 172, the adaptive digital equalizer 173, and the forward error correction circuitry 174.

The time domain adaptive digital equalizer 173 receives the output of the QAM demodulator 172. Because of the multi-path delays and possibly offset arrival of the overlapping transmissions from multiple transmitter sites, the output of the demodulator 172 will not be a clean digital pulse stream. Instead, the signal will be a composite of time delayed copies of the transmitted digital information. The time domain adaptive equalizer 173 includes a multi-tap digital delay line, the length of which defines the time window of the delay equalizer. The outputs from the taps of the delay line may be weighted and summed, and the sum processed by a level detector or the like to recapture the original symbols (e.g. 1s and 0s of a digital stream). Examples of digital delay equalizers which may be used in the receivers of the present invention are described in Proakis, "Digital Communications," second edition, 1989, McGraw-Hill, Inc., chapter 6, although still other types of delay equalizers known to skilled technicians may be used. The forward error correction circuit 174 processes the recaptured symbols (e.g. 1s and 0s) to determine if each is in the proper position in the stream.

A control interface 176 provides appropriate control signals to the elements of the digital receiver 103 in response to instructions from a hub controller 115 (FIG. 8). The digital receiver 103 processes signals selected from one of the RF channels by operation of the bandpass filter 171 to capture one of the digital transport streams (e.g. only 27 Mbits/s payload assuming 64 QAM). The digital receiver 103 outputs the transport stream as a corrected serial baseband digital feed to the associated Demux/Remux circuit 105.

In the illustrated implementation, the Demux/Remux circuit 105 includes a decryptor 181. The hub controller 115 (FIG. 8) controls all authorization functions of the shared receiving system $R_s$, including decryption. As shown in FIG. 8, the decryptor 181 receives authorization instructions from the hub controller 115. When properly authorized, the decryptor 181 decrypts payload data within packets of a each program in the transport stream output by the digital receiver 103. The decryptor 181 outputs a composite MPEG transport multiplex stream (e.g. at 27 Mbits/s) with appropriately decrypted components for the various programs contained therein to an MPEG demultiplexer 183.

In response to instructions from the hub controller 115, the MPEG demultiplexer 183 analyzes PID values of the packets in the transport stream to recognize packets for the different programs in the transport stream. On that basis, the MPEG demultiplexer 183 separates out the packets for each program and supplies the packets for each program on one of the outputs of the demultiplexer. In the present example assuming four 6 Mbits/s programs contained in the transport stream, the MPEG demultiplexer 183 will output the packets for each 6 Mbits/s program on one of four different output rails.

Each output of the MPEG demultiplexer 183 consists of MPEG II transport packets containing the video, audio and data (if any) for one broadcast program. If necessary, processing circuitry 185 may add necessary overhead packets (e.g. PID 0 packets, PID 1 packets, PMT packets, etc.) to conform each single program stream from the demultiplexer 183 to the MPEG II syntax.

Returning to FIG. 8, the Demux/Remux circuits 105 supply each recovered individual program stream to a modulator 107. The modulators provide ADSL type line encoding of digital bit streams for twisted wire transport. However, because these units are providing only the downstream transport, full asymmetrical modem capability is unnecessary. The units 107 provide downstream modulation only, typically using carrierless amplitude phase modulation (CAP), discrete multi-tone (DMT) modulation, or other ADSL type line code modulation.

Each modulator 107 outputs a modulated signal in the broadband higher frequency channel indicated for ADSL line code in the spectrum chart shown in FIG. 7A. The modulated signal output by each modulator carries the MPEG II transport stream for a single one of the broadcast programs.

The modulators 107 supply the analog broadband channel signals to input ports of a switch 109. As such, the switch 109 receives a modulated analog signal representing each one of the broadcast programs received by the landline interface system 32. Assume for example that the wireless broadcast system has MMDS and ITFS licenses for 30 channels in the relevant portion of the UHF microwave range and encodes and multiplexes 4 programs for transport in each licensed channel. The landline interface system 32 therefore includes 30 operative digital receivers 103 and 30 operative Demux/Remux circuits 105. The landline interface system 32 includes 120 (4×30) operative modulators 107 supplying 120 separate modulated program signals to the input ports of the switch 109.

The switch 109 has one output port for each twisted wire pair 34 used to transport programming from the system 32 to the individual living units 75. Under control of the hub controller 115, the switch 109 routes any selected one of the modulated program signals on its input ports for output through a splitter/combiner 111 to the any one of the subscriber loops 34. Each splitter/combiner 111 includes an appropriate directional coupler and appropriate filters to route the signal in the channel assigned to the ADSL line code through from the switch 109 to the connected twisted wire pair loop 34, i.e. in the down stream direction.

The switch 109 can connect a single input port to a single output port, if only one subscriber requests a particular program. The switch 109 also has multi-point connection capability. This means that the switch 109 can connect any one input port to a plurality or all of its output ports, for example if a large number of subscribers request the same program at the same time.

As noted above, a signaling channel is provided over each subscriber loop 34. Although other modulation techniques and/or channelizations could be used, the presently preferred embodiment utilizes QPSK modems 113 operating in a frequency band between the POTS channel and the downstream broadband channel. In such an implementation, the QPSK modems 113 provide a two-way data signaling capability between the terminals 100 in the individual living units 75 and the hub controller 115 in the landline interface system 32.

Each QPSK modem 113 connects to one of the telephone loops 34 through an associated one of the splitter/combiner units 111. Each QPSK modem 113 receives the spectrum channel for upstream signaling from the line 34 via the splitter/combiner 111, demodulates signaling data received via that channel and supplies the data through an appropriate interface to the hub controller 115. The hub controller 115 identifies the subscriber sending the data by identifying the modem 113 through which the data was received. For each terminal, the hub controller supplies downstream signaling data to a QPSK modem 113 connected to the line 34 going to that terminal 100. The QPSK modem 113 modulates the downstream signaling data and outputs the data in the channel range assigned for downstream signaling data. The QPSK modem 113 supplies the downstream signaling data channel, containing the modulated downstream signaling messages, to the splitter/combiner 111. The splitter/combiner 111 in turn frequency multiplexes the modulated downstream signaling channel information together with all other downstream signals and transmits the resultant multiplex over the subscriber's telephone loop 34, for transport to the connected terminal 100.

Using signaling through the modems 113, the hub controller 115 responds to selection signals from end users to control the switch 109 to supply selected programs over each subscriber's telephone loop 34. The hub controller 115 may also supply information needed to enable decoding of the digital signals back to the terminals 100 through the QPSK modems 113.

The splitter/combiner 111 is a diplex filter network for combining signals in certain frequency channels together and transmitting those signals downstream over the local loop 34. The diplex filter network also receives certain frequency channels in the upstream direction and separates out those frequency channels. More specifically, each splitter/combiner 111 receives downstream POTS signals from one of the lines connected to the CO 45, broadband signals from one output port of the switch 109 and downstream QPSK modulated signaling information from one of the QPSK modems 113 and frequency multiplexes those signals together (e.g. in the manner shown in FIG. 7A) for downstream transmission over the connected telephone loop 34. From the loop 34, the splitter/combiner 111 receives upstream POTS telephone signals and upstream QPSK signaling information, in the respectively assigned frequency channels. The splitter/combiner 111 separates out the upstream telephone signals and the upstream QPSK signals. The splitter/combiner 111 supplies the upstream telephone signals over the line to the CO 45 and supplies the upstream QPSK signals to the associated QPSK modem 113.

Figure 10:
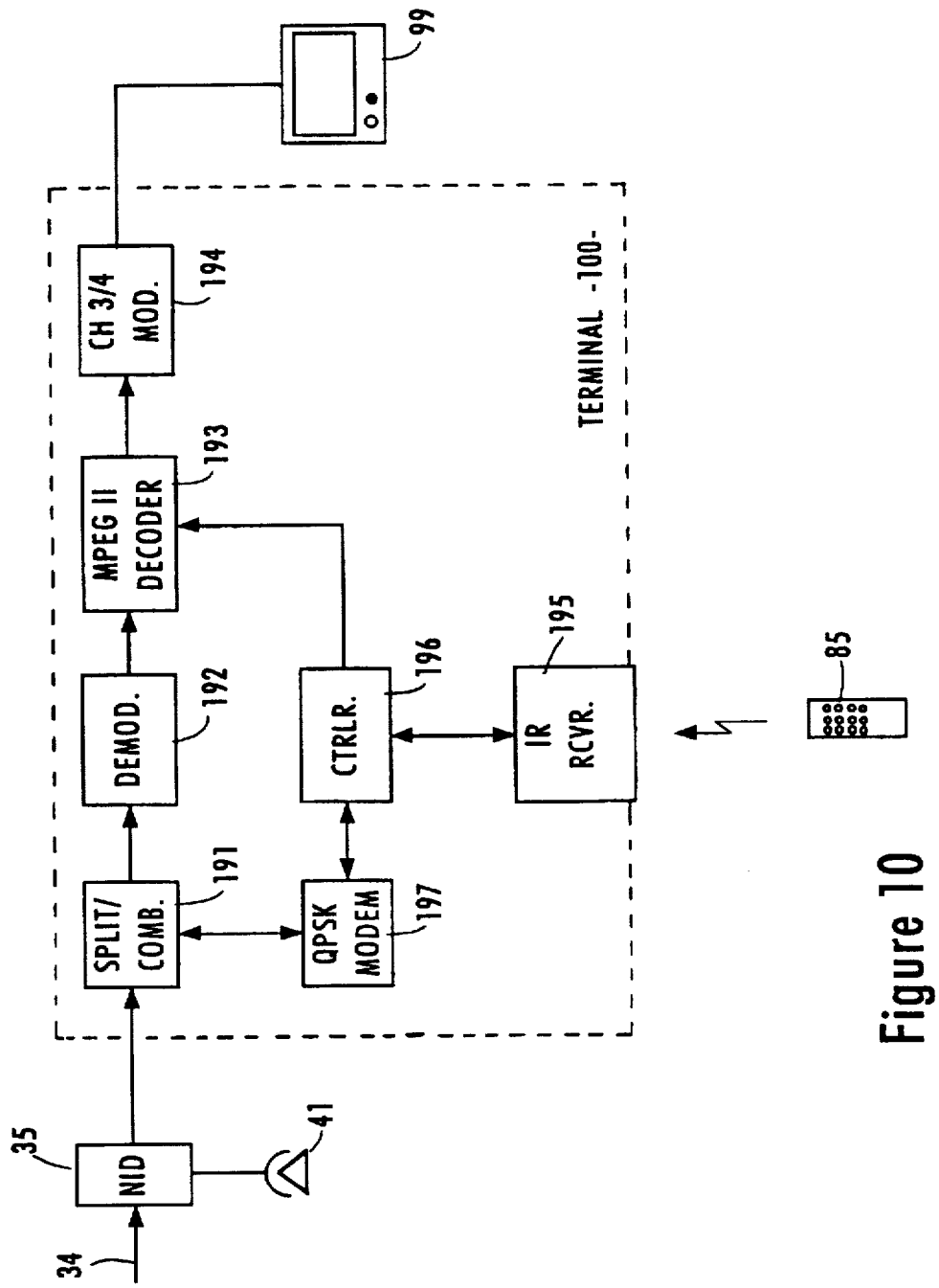
FIG. 10 is a functional block diagram showing the elements of the system of FIG. 7 located in the living unit in somewhat more detail.

FIG. 10 shows the elements of the terminal 100 and the other components in one of the living units 75. As shown, the telephone loop 34 from the landline interface system 32 connects to a NID 35. The NID provides two-way coupling of the POTS signals between the line 34 and the customer premises telephone equipment 41.

The NID 35 comprises a POTS splitter/combiner. The POTS splitter/combiner is another diplex filter network. This filter network passes downstream signals in the telephone frequency band (e.g. 300 hz to 4 kHz) through standard telephone wiring in the living unit to one or more POTS telephones 41. The POTS splitter/combiner also receives telephone frequency band (e.g. 300 hz to 4 kHz) signals from the telephone(s) 41. In the upstream direction, the splitter/combiner in NID 35 frequency multiplexes the upstream telephone frequency signals together with any other upstream information (e.g. the QPSK upstream signaling channel from the terminal 100) for transmission upstream over loop 34 to the combiner/splitter 111 serving this customer's line in the landline interface system 32.

The POTS splitter/combiner in the NID 35 passes downstream signals in frequency ranges above the maximum telephone frequency used (e.g. above 4 kHz) over twisted wire pair, coaxial cable or the like to the another splitter/combiner 191 within the terminal 100. The splitter/combiner 191 is another diplex filter network. The splitter/combiner 191 couples the downstream broadband channel, containing the ADSL line code information for a selected broadband broadcast program to a demodulator 192. The demodulator is an ADSL-like demodulator, in that it demodulates the particular type of modulation or line code used by the modulators 107 (e.g. CAP or DMT). The demodulator 192 recovers the single program transport stream (e.g at 6+ Mbits/s) from the analog broadband channel on the loop 34 and supplies the recovered transport stream to an MPEG II decoder 193. The MPEG II decoder 193 preferably is a single chip decoder designed to convert a single program input stream into an NTSC format analog video signal.

The MPEG II decoder may supply the NTSC signal as a baseband feed to the television 99. Preferably, the terminal includes a modulator 194, for modulating the NTSC signal from the decoder 193 onto either channel 3 or channel 4. A coaxial cable or the like connects the output of the modulator 194 to the cable or antenna input of a standard television set 99. To view received programming, the user turns on the television set 99 and tunes that set to the channel (3 or 4) that is output by the modulator 194. The television processes the channel 3 or 4 video signal to produce an audio/video presentation of the broadband information to the user.

The installation in the living unit also includes a remote control 85. In response to user activation, the remote control 85 transmits infrared (IR) data signals to an IR receiver 195 in the terminal 100. The IR receiver 195 decodes received IR signals and supplies received data messages to a controller 196. In response, the controller supplies appropriate data messages to a QPSK modem 197. The modem 197 in turn QPSK modulates the messages for transmission to the landline interface system 32. The modem 197 supplies modulated information, in the upstream channel frequency range, to the splitter/combiner 191. The splitter/combiner 191 sends the signaling channel frequency information upstream to the NID 35. The POTS splitter/combiner in the NID 35 frequency multiplexes the upstream signaling channel together with the upstream POTS information and applies the resultant upstream multiplex to the telephone loop 34 for transport over the loop to the splitter/combiner 111 connected to the subscriber's loop 34 within the landline interface system 32.

As discussed above, the downstream signals on the telephone loop 34 include POTS signals, downstream QPSK signaling messages and broadband information (see FIG. 7A). In the living unit, the splitter/combiner in the NID 35 splits off the downstream POTS information and supplies that information as standard telephone signals to one or more telephones 41. The splitter/combiner in the NID 35 supplies the downstream signaling channel and the ADSL line code frequency channel from the loop 34 to splitter/combiner 191 in the terminal 100. The splitter/combiner 191 frequency demultiplexes the downstream signals and supplies the ADSL line code frequency channel to the demodulator 192. The splitter/combiner 191 supplies the downstream signaling frequency channel to the QPSK demodulator 197.

The QPSK demodulator 197 demodulates the downstream signaling channel and supplies packet data messages from that channel to the terminal controller 196 for further processing. The downstream messages, for example, may relate to information such as PID values needed to control the decoder 193 to decode a selected program.

It will be readily apparent that the demodulator and decoder utilized in the terminal 100 are relatively simple in that neither has to have selection capacity. The demodulator need not select from a plurality of broadcast channels, because that function is performed by the digital receivers 103 in the landline interface system 32. Similarly, the decoder need not operate at the full 27 Mbits/s rate and need not select one program from among several contained in the 27 Mbits/s rate stream, because those functions are performed by the Demux/Remux circuits 105 in the landline interface system 32. The cost of the terminals 100 therefore is relatively low; and replacement of a terminal 100, due to damage or theft, therefore is less expensive. Also, because of the lack of full internal selectivity, the terminals 100 can not operate as stand-alone terminals, such as in the single residence installation $R_1$ shown in FIG. 7. As a result, tenants should be less inclined to steal the terminals 100 when they leave the rental property or the landlord evicts the tenants.

It will be helpful in understanding the invention to consider an operation of the system, step by step, in providing a selected program for viewing on a user's television set. In operation, a user activates the remote control 85 to select a program (FIG. 10). The IR receiver 195 supplies the input data message from control 85 to the controller 196. In response, the controller 196 formulates a program request message as packetized data. The controller 196 supplies that message to the QPSK modem 197 for upstream transmission through the splitter/combiner 191, the NID 35 and the signaling channel on the telephone loop 34.

In the landline interface system (FIG. 8), the splitter/combiner 111 connected to the subscriber's loop 34 supplies the upstream QPSK data signal to an associated one of the QPSK modems 113. The QPSK modem 113 demodulates the upstream signaling information and supplies the resultant data, in this case the program request message, to the hub controller 115.

The hub controller 115 may contain subscriber profile data and control access to at least some premium or pay-per-view channels based on the profile data. If so, the hub controller 115 determines if the requesting subscriber is authorized access to the requested program. If authorized, the hub controller 115 provides a control instruction to the switch 109. The instruction identifies the input port of the selected program and the output port connected to the line 34 to the terminal 100 from which the current request originated.

In response to the instruction from the hub controller 115, the switch 109 connects the broadband modulated analog signal from the identified input port (and connected modulator 107) to the splitter/combiner 111 coupled to the subscriber's line 34. As discussed above, the broadband signal carries a digital transport stream for a single selected program modulated using an ADSL-like modulation technique (e.g. CAP or DMT) in a frequency range assigned for broadband downstream transport over subscribers lines. The splitter/combiner 111 frequency multiplexes the broadband signal output by the switch 109 with any downstream POTS and QPSK signaling information and transmits the multiplexed signals over the particular subscriber's line 34.

In the living unit (FIG. 10), the splitter/combiner in the NID 35 supplies the downstream signaling and the ADSL line code frequency channel from the loop 34 to splitter/combiner 191 in the terminal 100. The splitter/combiner 191 frequency demultiplexes the downstream signals. The splitter/combiner 191 supplies the downstream signaling frequency channel to the QPSK demodulator 197. The splitter/combiner 191 couples the downstream broadband channel, containing the ADSL line code information for a selected broadband broadcast program, to the demodulator 192.

The demodulator 192 recovers the single program transport stream (e.g at 6+ Mbits/s) from the analog broadband channel on the loop 34 and supplies the recovered transport stream to the MPEG II decoder 193. The MPEG II decoder 193 decompresses the information from the packets in the single program stream and converts the uncompressed digitized digital data into an NTSC format analog video signal.

The terminal controller 196 supplies necessary information, if any, to the MPEG II decoder 193 to control operation thereof. The decoding process executed by the decoder 192 requires identification of the PID values for the transport packets containing the audio, video and data (if any) for the selected program. The terminal controller 196 may supply a program number (PN), which the decoder 193 uses to access information from the program association table (PID 0) and program map table to identify the PIDs for the selected program. Preferably, the controller 196 supplies the actual PID values, either from memory or received from the hub controller 115 via the downstream QPSK signaling communication.

The modulator 194 modulates the NTSC signal from the decoder 193 onto either channel 3 or channel 4 and supplies the modulated channel signal to the television set 99. The television set 99 processes the channel 3 or 4 video signal to produce an audio/video presentation of the selected program to the user.

Figure 11:
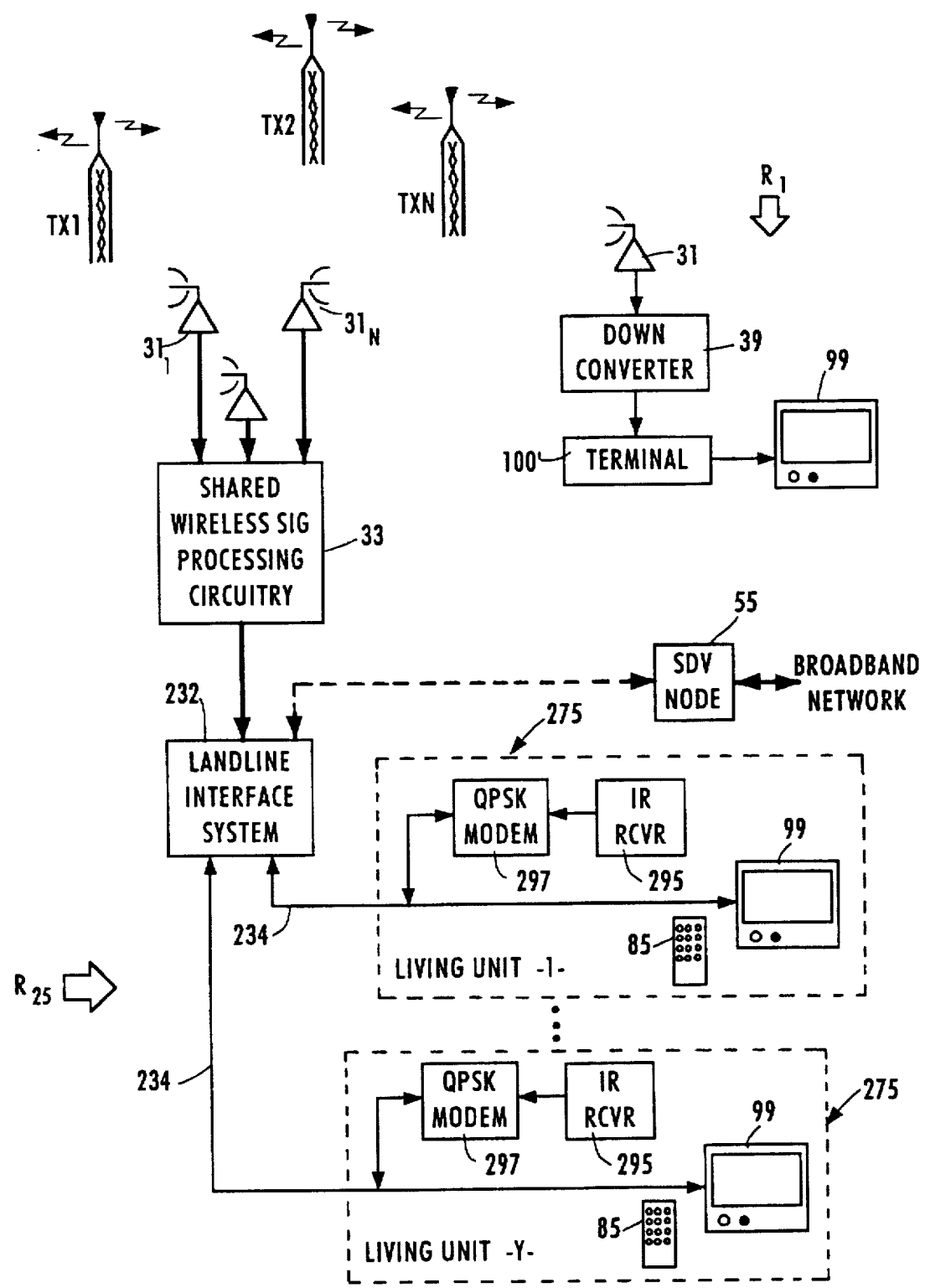
FIG. 11 illustrates the high-level functional elements of a customer premises receiver system and a second preferred embodiment of a common or shared receiving system in accord with the present invention.
Figure 12:
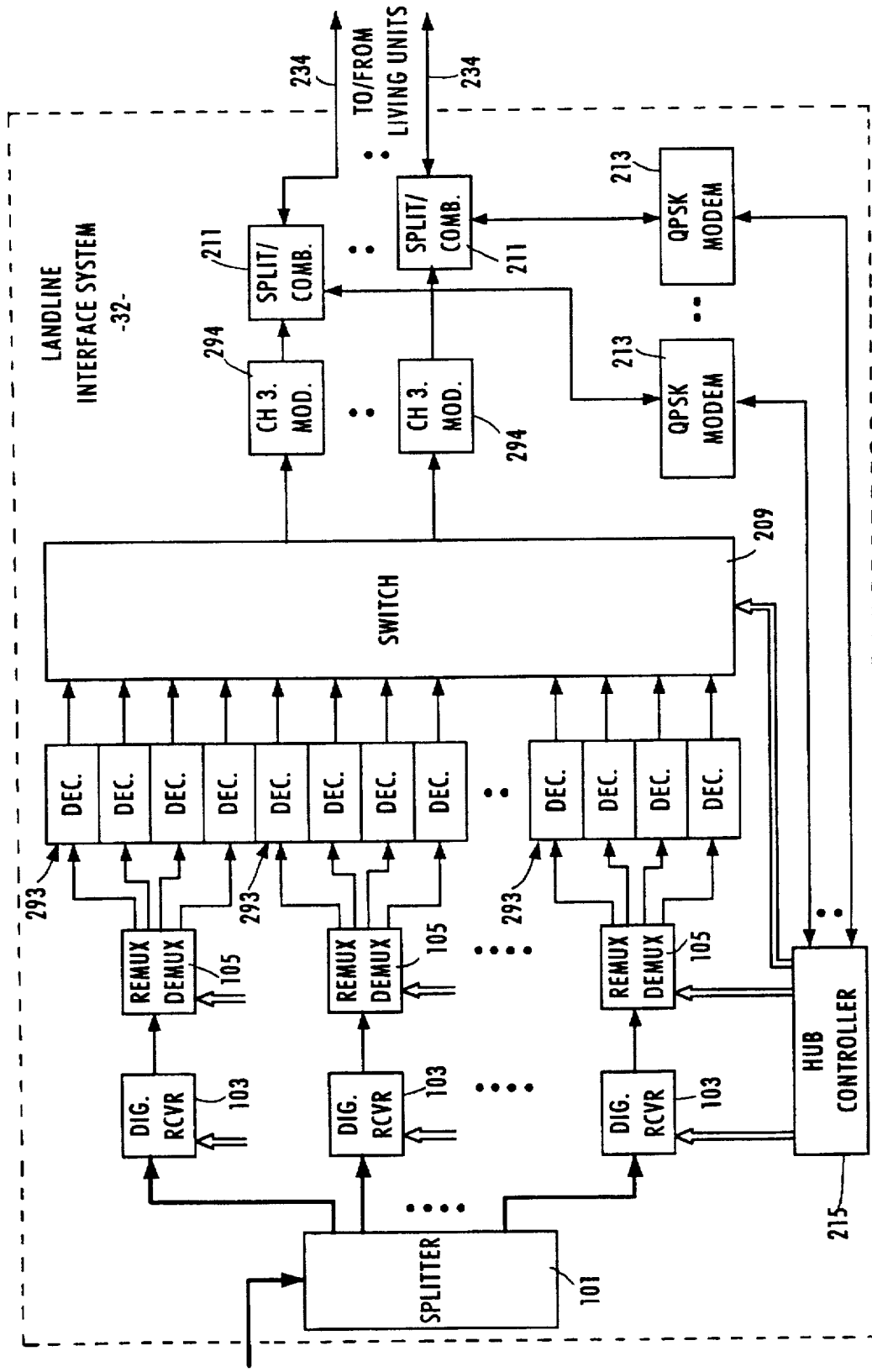
FIG. 12 is a more detailed functional block diagram of a landline interface system used in the shared receiving system illustrated in FIG. 11.

The above discussed preferred embodiment relies on twisted pair wiring. In many multi-unit complexes, such wiring already exists, and new wiring to each individual living unit is unnecessary. FIGS. 11 and 12 disclose an alternate embodiment of the shared receiving system or the present invention, which utilizes coaxial cable wiring from the landline interface to the individual living units. In some respects, the embodiment of FIGS. 11 and 12 corresponds to the embodiment of FIGS. 7 and 8, and as such, like elements are referenced by the same index numerals.

The shared receiving system $R_{2s}$ includes at least one and typically a plurality of directional microwave antennae, aimed at one of the transmitters TX1 to TXN. In the illustrated implementation, the system $R_{2s}$ includes the same number of microwave receiving antennae $31_1$ to $31_N$ as there are transmitters TX1 to TXN serving the region, with one of the microwave receiving antennae $31_1$ to $31_N$ aimed at each of the transmitters TX1 to TXN, as in the earlier embodiment.

Signals from the microwave receiving antennae $31_1$ to $31_N$ all go to shared wireless signal processing circuitry 33. The shared wireless signal processing circuitry 33 processes the signals from the microwave receiving antennae $31_1$ to $31_N$ to produce a single high quality RF spectrum signal in at least a portion of the 50–450 MHz range from the microwave transmissions, exactly as discussed above. The shared wireless signal processing circuitry 33 outputs the processed channel signals through a coaxial cable or the like to a landline interface system 232. The landline interface system 232 may also provide a connection to a node 55 of a landline based broadband network, such as a switched digital video (SDV) network. The landline interface system processes all received broadcast signals from the wireless transmission (and from the SDV node if so connected) to derive separate analog video signals for each individual broadcast program and supplies selected signals over the coaxial drop cables 234. A separate drop cable 234 couples the landline interface system 232 to each of the individual living units 275.

In each living unit 275, the coaxial drop cable 234 connects directly to the television set 99. As discussed more fully below, the landline interface system 232 decodes a selected program from the digital broadcast information and supplies that program as an analog television channel signal over the coaxial cable 34. The television 99 receives and processes the analog channel signal in the normal manner to provide a typical audio/video television type presentation of selected programming to a viewer.

The added equipment in the living unit, in this embodiment, includes only a remote control device 85, an infrared (IR) receiver 295 processing the signals from the remote control, and a QPSK modem 297 responsive to data from the IR receiver 295 for transmitting selection requests upstream over the coaxial cable 234 to the landline interface system 232.

Figure 11A:
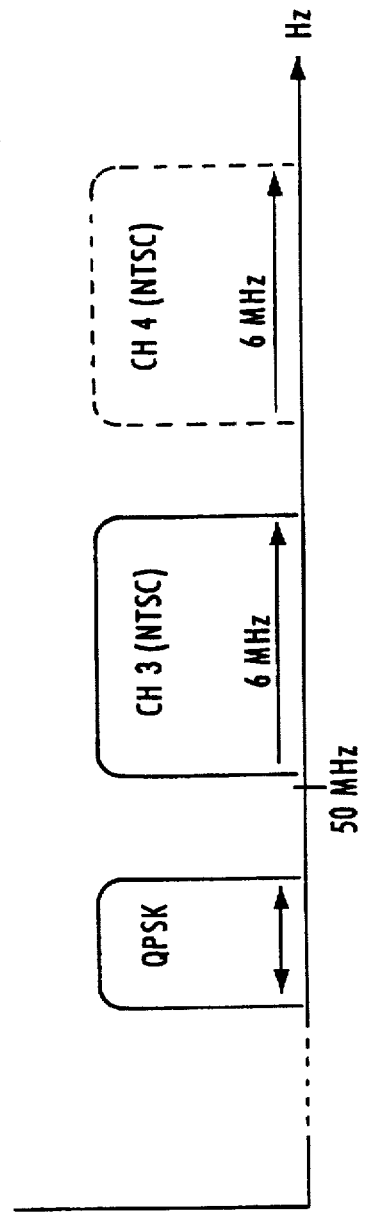
FIG. 11A is a spectrum diagram (not to scale) of the frequency channelization on coaxial drop cable in the shared receiving system illustrated in FIG. 11.

One example of a frequency channelization for use on a coaxial drop cable 234 appears in FIG. 11A. Although it would be possible to transport POTS service signals over the coaxial cables, it has been assumed that separate twisted wire pairs (not shown) carry those signals. Accordingly, in the example illustrated in FIG. 11A, there are no POTS signals on the coaxial cable. A standard television channel somewhere above the 50 Mhz level, e.g. channel 3 (61.25 to 65.75 MHz), carries a standard modulated NTSC signal. If one or more additional televisions in the same living unit receive service through the same cable, each such additional television would receive a higher assigned channel slot on coaxial cable 234. For example, a second television would receive programming via television channel 4 (67.25 to 71.75 MHz) shown in dotted lines in FIG. 11A.

The frequency allocation on the loop 234 also provides at least a one-way (upstream) signaling channel. In the presently preferred example illustrated in FIG. 11A, a two-way signaling channel is provided in some convenient frequency range below the frequencies used for video transport, i.e. below the 50 MHz level. As in the earlier embodiment, the signaling channel carries packetized data communications using QPSK modulation. Persons skilled in the art will recognize that a variety of frequency values can be used for the various channels shown in FIG. 11A.

FIG. 12 illustrates the functional elements of an exemplary implementation of the landline interface system 232. For simplicity of discussion, it again is assumed that the landline interface system 232 receives only broadcast signals from the wireless broadband transmission system of FIG. 6. The illustrated system 232 therefore includes processing elements to derive a digital transport stream for each wireless broadcast program. Additional processing circuitry (not shown) would be provided to derive signals for programs supplied through the SDV node 55 (FIG. 11).

A splitter 101 receives the combined spectrum signal in the 50–450 MHz range via the coaxial cable, directly from a downconverter in a single receiving antenna installation or from the shared wireless signal processing circuitry 33 in a multiple receiving antenna implementation such as that shown in FIG. 11. The splitter supplies the combined spectrum signal to each of a plurality of digital receivers 103. The digital receivers 103 in turn recover the digital transport stream (e.g. 27 Mbits/s payload only) from each of the broadcast channels and supply those signals to associated Demux/Remux circuits 105. Each digital receiver 103 supplies a 27 Mbits/s transport stream, containing a plurality of programs to a digital signal processor identified as a 'Demux/Remux' circuit 105. The Demux/Remux circuit 105 separates out a digital stream for each individual program carried in the broadcast transport stream. The splitter 101, the digital receivers 103 and the Demux/Remux circuits 105 shown in FIG. 11 are identical to those discussed above with regard to FIGS. 8 and 9.

Each output of the Demux/Remux circuits 105 consists of MPEG II transport packets containing the video, audio and data (if any) for one broadcast program encoded in conformance with MPEG II syntax. The Demux/Remux circuits 105 supply each individual single program transport stream to an MPEG II compliant decoder 293. The decoders 293 are substantially similar to the decoders 193 included in the terminals in the earlier embodiment, except that the decoders 293 all are controlled directly by the single hub controller 215. Each MPEG II decoder 293 decompresses the information from the packets in a single program transport stream and converts the uncompressed digitized digital data into an NTSC format baseband analog video signal.

Each decoder 293 outputs an NTSC baseband signal to one input port of a switch 209. As such, the switch 209 receives an analog signal for each of the broadcast programs received by the landline interface system 232. Assume for example that the wireless broadcast system has licenses for 30 channels in the relevant portion of the UHF microwave range and encodes and multiplexes 4 programs for transport in each licensed channel. The landline interface system 232 therefore includes 30 operative digital receivers 103 and 30 operative Demux/Remux circuits 105. The landline interface system 232 includes 120 (4×30) operative decoders 293 supplying 120 separate analog program signals to the input ports of the switch 209. Additional sets of digital receivers, Demux/Remux circuits and decoders may be provided as spares, in a manner similar to the earlier embodiment.

The switch 209 has one output port for each television independently serviced by the system 232. Assume for simplicity that each living unit has one television set 99. The switch 209 has output ports going to analog NTSC modulators, typically operating at channel 3. There is one channel 3 modulator 294 and one splitter/combiner 211 for each coaxial drop cable 234. The modulated signal output by the each modulator 294 goes through a splitter/combiner 211 to one of the coaxial cables 234. Each splitter/combiner includes an appropriate directional coupler and appropriate filters to route the modulated television signal, e.g. channel 3, through from the switch 209 to the connected coaxial cable 234 in the downstream direction. The coupler may also couple higher frequency channel signals, e.g. channel 4 and higher, from separate modulators coupled to the switch, to provide additional services to additional televisions in the same living units.

The switch 209 can connect a single input port to a single output port, if only one subscriber requests a particular program. The switch 209 also has multi-point connection capability. This means that the switch 209 can connect any 1 input port to a plurality or all of its output ports, for example if a large number of subscribers request the same program at the same time.

As noted above, a signaling channel is provided over each subscriber's coaxial drop cable 234. Although other modulation techniques and/or channelizations could be used, the presently preferred embodiment utilizes QPSK modems 213 operating in a frequency band below 50 MHz, in a manner similar to signaling communications utilized on cable television networks. In such an implementation, the QPSK modems provide a two-way data signaling capability between the living units and the hub controller 215 in the landline interface system 232.

Each QPSK modem 213 connects to one of the coaxial cables through an associated one of the splitter/combiner units 211. Each QPSK modem 213 receives upstream signaling from the line 234 via the splitter/combiner 211, demodulates the received signaling data and supplies the data through an appropriate interface to the hub controller 215. The hub controller 215 supplies downstream signaling data (if any) to a QPSK modem 213. The QPSK modem modulates the downstream signaling data and outputs the data in the channel range assigned for signaling data. The QPSK modem 213 supplies the downstream signaling, containing the modulated downstream signaling messages, to the splitter/combiner 211. The splitter/combiner 211 in turn frequency multiplexes the modulated downstream signaling information together with all other downstream signals and transmits the resultant multiplex over the subscriber's coaxial drop cable 234. Using upstream signaling through the modems 213, the hub controller 215 responds to selection signals from end users to control the switch 209 to supply selected programs over each subscriber's coaxial drop cable 234.

It will be readily apparent that the equipment in the living units in the second embodiment is even simpler than that in the earlier embodiment. The living unit equipment includes the subscriber's television 99 and only the remote control 85, the IR receiver 295 and the QPSK modem 297. The cost of such limited equipment is correspondingly lower, and replacement due to damage or theft by rental property tenants is less expensive. Also, because of the lack of any demodulator or decoder in the living unit, tenants should be less inclined to steal the equipment when they leave the rental property or the landlord evicts the tenants.

To assist in understanding the invention, a description of a step by step operation of the embodiment of FIGS. 11 and 12 in providing a selected program for viewing on a user's television is set forth below.

In operation, a user activates the remote control 85 to select a program. The IR receiver 295 (FIG. 11) supplies the input data message from the remote control to the QPSK modem 297, for upstream transmission through the signaling channel on the subscriber's coaxial drop cable 234. In the landline interface system 232 (FIG. 12), the splitter/combiner 211 connected to the subscriber's cable 234 supplies the upstream QPSK data signal to an associated one of the QPSK modems 213. The QPSK modem demodulates the upstream information from the signaling channel and supplies the resultant data, in this case the program request message, to the hub controller 215.

The hub controller 215 may contain subscriber profile data and control access to at least some premium or pay-per-view channels based on the profile data. If so, the hub controller determines if the requesting subscriber is authorized access to the requested program. If authorized, the hub controller 215 provides a control instruction to the switch 209. The instruction identifies the input port of the selected program and the output port connected to the modulator 294 serving the requesting subscriber.

In response to the instruction from the hub controller 215, the switch 209 connects the NTSC baseband signal from the identified input port (and the connected MPEG II decoder 293) to the modulator 294. The modulator 294 in turn outputs the signal for the selected program, now modulated on the channel used by the subscriber's television 99, to the splitter/combiner 211 coupled to the subscriber's drop cable 234.

In this implementation, the broadband signal coupled downstream to the cable 234 is in a standard channel format compatible with television set 99. The television 99 receives and processes the analog channel signal via the coaxial cable 234 in the normal manner, to provide a television type audio/video presentation of the selected programming to a viewer.

In the embodiment of FIG. 7, each twisted wire pair transports a modulated broadband signal containing a digital transport stream for a single program. To provide service to two televisions in one living unit requires two loops 34 going to the one living unit. For simplicity, the above discussion of the embodiment of FIGS. 11 and 12 concentrated on transmission of a single program over the coaxial cable drop 234 going to each living unit. However, the coaxial cable drops have a much broader bandwidth and can carry a variety of other information. Of particular note, one coaxial cable 234 can carry two, three or more video channels to provide services to additional television sets in each living unit. For each drop providing a second channel, for example, an additional modulator operating in a higher frequency channel (e.g. channel 4) would connect to another output port of the switch 209. The output of the second modulator would be coupled through the splitter/combiner 211 to the same coaxial cable 234 serving the one living unit. As a result, two separate channels on the cable would carry separately switched programming from the landline interface units 232 to two televisions 99 in the one living unit.

The above detailed description has concentrated on the preferred embodiments of the present invention. Those skilled in the art will recognize that each embodiment may be subject to a number of variations. For example, certain functions of the shared wireless signal processing circuitry and the landline interface may be combined into a single hub installation. As another example, in the coaxial cable installation, the NTSC modulators may be placed upstream of the switch, and the switch would route modulated NTSC signals (e.g. at channel 3 or 4 frequencies). Such an installation would utilize one modulator for each program, instead of one modulator for each coaxial cable, as in the embodiment illustrated in FIG. 12. Also, other types of receivers and/or demultiplexers would be used to derive the separate digital program streams from signals from broadband networks using other types of channelization and/or digital multiplexing.

Also, the above discussion has concentrated on the preferred embodiment which broadcasts video programming. It should be noted, however, that the system may transport other types of programming, such as audio, data and/or telemetry.

While this invention has been described in connection with what is presently considered to be the preferred embodiments, it is to be understood that the invention is not limited to the disclosed embodiments, but, on the contrary, is intended to cover various modifications and equivalent arrangements included within the spirit and scope of the appended claims.

We claim:

1. A communication system receiving a plurality of multiplexed digitized information signals relating to a plurality of programs, said communication system comprising:

means for processing the multiplexed digitized information signals relating to the plurality of programs to derive separate program signals, each program signal containing information relating to a single one of the plurality of programs;

a plurality of lines, each line coupled to a broadband output device;

a switch, coupled between the means for processing the multiplexed digitized information signals and the plurality of lines, for routing selected ones of the program signals; and a controller controlling the routing by the switch in response to program requests received via the plurality of lines.

2. A communication system as in claim 1, wherein the plurality of multiplexed digitized information signals comprise a plurality of multiplexed channels, each channel carrying a digital transport stream containing multiplexed digitized information relating to a group of the programs, and the means for processing the multiplexed digitized information signals comprises:

a plurality of receivers, one receiver for each of the plurality of multiplexed channels, wherein each receiver processes a different one of the multiplexed channels to recover the digital transport stream therefrom; and demultiplexer means for demultiplexing each recovered digital transport stream, to thereby derive separate digital program signals, each digital program signal containing digitized information relating to a single one of the plurality of programs.

3. A communication system as in claim 2, wherein:

the means for processing the multiplexed digitized information signals further comprises modulators, each modulator modulating one of the separate digital program signals; and the switch selectively routes the modulated digital program signals.

4. A communication system as in claim 3, wherein the lines are telephone loops, and the modulators modulate the digital program signals into a predetermined frequency range compatible with transport over telephone loops.

5. A communication system as in claim 4, wherein telephone loops comprise twisted wire pairs.

6. A communication system as in claim 4, wherein the system further comprises splitter/combiners, one splitter/combiner being coupled between an output port of the switch and each respective telephone loop for frequency division multiplexing a modulated signal from the switch output port together with downstream telephone signals from a telephone network for transport over the respective telephone loop and for frequency demultiplexing upstream signals received over the respective telephone loop to supply upstream telephone signals from the loop to the telephone network and to supply upstream control program request signals from the respective telephone loop to the controller.

7. A communication system as in claim 2, wherein:

the means for processing the multiplexed digitized information signals further comprises digital decoders, each digital decoder converting one of the separate digital program signals to a corresponding television signal; and the switch selectively routes the television signals output by the digital decoders.

8. A communication system as in claim 7, further comprising television channel modulators for modulating television program signals into a predetermined television channel.

9. A communication system as in claim 8, wherein at least one of the television channel modulators is coupled between an output port of the switch and each of the plurality of lines.

10. A communication system as in claim 7, wherein each of the digital decoders comprises an MPEG decoder.

11. A communication system as in claim 2, wherein each of the receivers comprises:

a channel selector; and a demodulator.

12. A communication system as in claim 11, wherein the channel selector comprises a frequency channel selector.

13. A communication system as in claim 11, wherein the demodulator comprises a QAM demodulator.

14. A communication system as in claim 11, wherein each of the receivers further comprises an adaptive delay equalizer.

15. A communication system as in claim 11, wherein each of the receivers further comprises forward error correction circuitry.

16. A communication system as in claim 1, wherein the plurality of multiplexed digitized information signals comprise a plurality of multiplexed wireless broadcast channels, said communication system further comprising at least one antenna receiving and supplying multiplexed wireless broadcast channels to the means for processing the digitized information signals.

17. A communication system as in claim 1, wherein at least some of the routing by the switch comprises point to multi-point routing.

18. A communication system as in claim 1, wherein the lines run to a plurality of living units.

19. A communication system, comprising:

a broadcast network broadcasting a plurality of multiplexed digitized information signals relating to a plurality of programs; and a plurality of receiving systems receiving the plurality of multiplexed digitized information signals from the broadcast network;

wherein one of the receiving systems serves a plurality of living units, the one receiving system comprising:

(a) means for processing the multiplexed digitized information signals relating to the plurality of programs to derive separate program signals, each program signal containing information relating to a single one of the plurality of programs;

(b) a plurality of lines, each line coupled to a broadband output device in one of a plurality of living units;

(c) a switch, coupled between the means for processing the multiplexed digitized information signals and the plurality of lines, for routing selected ones of the program signals; and (d) a controller controlling the routing by the switch in response to program requests received via the plurality of lines.

20. A communication system as in claim 19, wherein the broadcast network comprises a headend system producing a signal containing multiplexed channels, each channel carrying a transport stream comprising multiplexed streams of digitized broadband information, each multiplexed stream consisting essentially of digitized information relating to one of the plurality of programs.

21. A communication system as in claim 20, wherein the broadcast network further comprises at least one broadband wireless transmitter for broadcasting the signal containing multiplexed channels into a service area.

22. A communication system as in claim 21, wherein the one receiving system further comprises at least one receiving antenna for receiving the wireless transmission of the signal containing multiplexed channels and supplying the received signal containing multiplexed channels to the means for processing the multiplexed digitized information signals.

23. A communication system as in claim 22, wherein:

said at least one broadband wireless transmitter comprises a plurality of transmitters located at spaced apart sites transmitting said signal containing multiplexed channels so that areas of propagation from respective ones of the transmitters substantially overlap over each other in at least a major portion of a service area encompassing the receiving systems; and the at least one receiving antenna comprises a directional antenna directed towards one of the transmitters.

24. A communication system as in claim 23, wherein:

the at least one antenna comprises at least two directional receiving antennae, each directional receiving antenna being directed to receive said signal from a different one of the transmitters; and the one receiving system further comprises signal processing circuitry receiving a signal from each of the receiving antennae and in response thereto supplying a single optimized representation of said signal including multiplexed channels to the means for processing the multiplexed digitized information signals.

25. A communication system as in claim 21, wherein said at least one broadband wireless transmitter comprises a plurality of transmitters located at spaced apart sites transmitting said signal containing multiplexed channels so that areas of propagation from respective ones of the transmitters substantially overlap over each other in at least a major portion of a service area encompassing the receiving systems.

26. A system as in claim 20, wherein the headend comprises:

(1) a source of a first digital multiplexed data stream containing a plurality of packet streams, each packet stream carrying digitized data representing one of a first group of programs, (2) a source of a second digital multiplexed data stream containing a plurality of packet streams, each packet stream carrying digitized data representing one of a second group of programs, and (3) a modulation system modulating the first digital multiplexed data stream and the second digital multiplexed data stream into first and second channels, respectively.

27. A communication system as in claim 26, wherein at least one of the sources comprises:

a plurality of encoders responsive to analog audio and video information for producing packets of digitized, compressed audio and video data; and a multiplexer multiplexing packets of digitized, compressed audio and video data from the plurality of encoders into one digital multiplexed data stream.

28. A communication system as in claim 26, wherein said modulation system comprises:

a first modulator for modulating the first digital multiplexed data stream into the first channel;

a second modulator for modulating the second digital multiplexed data stream into the second channel; and a combiner combining output signals from the first and second modulators into a combined spectrum signal for broadcast.

29. A communication system as in claim 28, wherein each of the first and second modulators comprises a quadrature amplitude modulator.

30. A communication system as in claim 19, wherein the broadcast system comprises a landline broadband network.

31. A communication system comprising:

a headend comprising:
(1) a source of a first digital multiplexed data stream containing a first plurality of packet streams, each packet stream of the first plurality of packet streams carrying digitized data representing one of a first group of video programs,
(2) a source of a second digital multiplexed data stream containing a second plurality of packet streams, each packet stream of the second plurality of packet streams carrying digitized data representing one of a second group of video programs,
(3) a modulation system modulating the first digital multiplexed data stream and the second digital multiplexed data stream into first and second channels, respectively;

a plurality of wireless transmitters located at respective different sites in a service area, the transmitters simultaneously transmitting a combined wireless signal containing the first and second channels into overlapping portions of the service area; and a plurality of receiver systems within the service area, at least one of the receiver systems serving a plurality of living units, said at least one of the receiver systems comprising:
(a) means for processing the combined wireless signal to derive separate program signals, each program signal containing information relating to a single one of the video programs;
(b) a plurality of lines, each line coupled to a broadband output device in one of a plurality of living units;
(c) a switch coupled between the means for processing and the plurality of lines, for routing selected ones of the video program signals; and
(d) a controller controlling the routing by the switch in response to program requests received via the lines.

32. A communication system as in claim 31, wherein the means for processing comprises:

a first demodulator demodulating the first channel to recover the first transport stream;

a first demultiplexer separating out the first plurality of packet streams from the recovered first transport stream;

a second demodulator demodulating the second channel to recover the second transport stream; and a second demultiplexer separating out the second plurality of packet streams from the recovered first transport stream.

33. A communication system as in claim 32, wherein the means for processing further comprises:

a first group of modulators, each modulator in the first group of modulators modulating one of the first plurality of packet streams from the recovered first transport stream; and a second group of modulators, each modulator in the second group of modulators modulating one of the second plurality of packet streams from the recovered second transport stream.

34. A communication system as in claim 33, wherein the lines are telephone loops, and each of the modulators in the first and second groups of modulators modulate one packet stream into a predetermined frequency range compatible with transport over telephone loops.

35. A communication system as in claim 32, wherein the means for processing further comprises a plurality of digital decoders, each digital decoder coupled to one output of the demultiplexers for converting one packet stream to a corresponding television signal.

* * * * *